US011184486B2

(12) United States Patent
Ybanez et al.

(10) Patent No.: US 11,184,486 B2
(45) Date of Patent: Nov. 23, 2021

(54) IMAGE FORMING APPARATUS FOR READING PLURAL DOCUMENTS PLACED ON DOCUMENT SUPPORT SURFACE AND ACQUIRING CHARACTERS FROM IMAGES OF READ DOCUMENTS

(71) Applicant: KYOCERA Document Solutions Inc., Osaka (JP)

(72) Inventors: Maria Johanna Ybanez, Osaka (JP); Roy Vincent Maranon, Osaka (JP); Kenneth Arrieta, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/899,469

(22) Filed: Jun. 11, 2020

(65) Prior Publication Data

US 2020/0396340 A1 Dec. 17, 2020

(30) Foreign Application Priority Data

Jun. 13, 2019 (JP) .............................. JP2019-110503

(51) Int. Cl.
*H04N 1/00* (2006.01)
*G06K 9/00* (2006.01)

(52) U.S. Cl.
CPC ..... *H04N 1/00005* (2013.01); *G06K 9/00295* (2013.01); *H04N 1/00037* (2013.01); *H04N 1/00331* (2013.01); *H04N 1/00442* (2013.01); *H04N 1/00567* (2013.01)

(58) Field of Classification Search
None
See application file for complete search history.

(56) References Cited

U.S. PATENT DOCUMENTS

2018/0077309 A1* 3/2018 Saitoh .................. H04N 1/3873
2018/0367695 A1* 12/2018 Horie ................. H04N 1/32128

FOREIGN PATENT DOCUMENTS

JP          2018-142108 A      9/2018

* cited by examiner

*Primary Examiner* — Andrew H Lam
(74) *Attorney, Agent, or Firm* — IP Business Solutions, LLC

(57) ABSTRACT

An image forming apparatus includes: a document reading device that reads a plurality of original documents on a document support surface in a batch; an individual image cutouter that cuts individual images of the original documents out of image data obtained by batch reading; a character recognizer that recognizes, for each individual image, characters in the individual image; a document determiner that determines, for each individual image, whether the recognized characters contain a type name; an acquirer that acquires, from the characters determined to contain the type name, a plurality of informative character strings associated one-to-one with a plurality of item names; a data generator that generates, for each individual image, a piece of document data in which the type name is associated with the plurality of acquired informative character strings; and a document data storage that stores the pieces of document data generated one for each individual image.

11 Claims, 19 Drawing Sheets

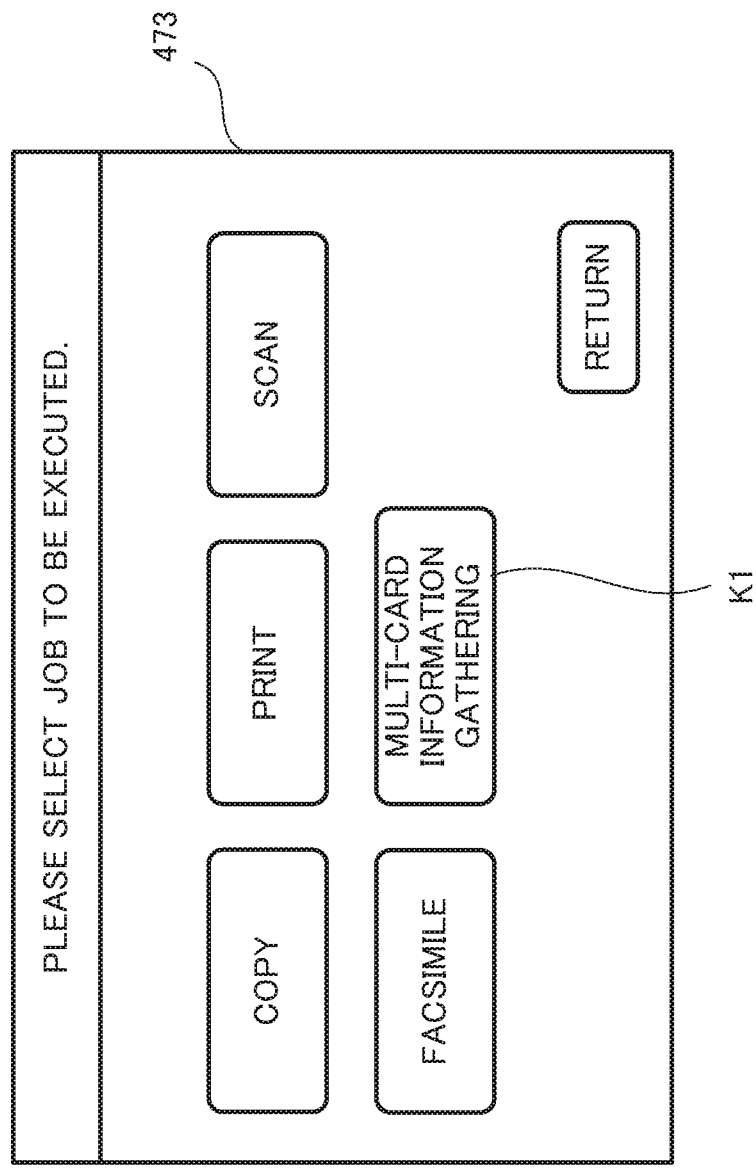

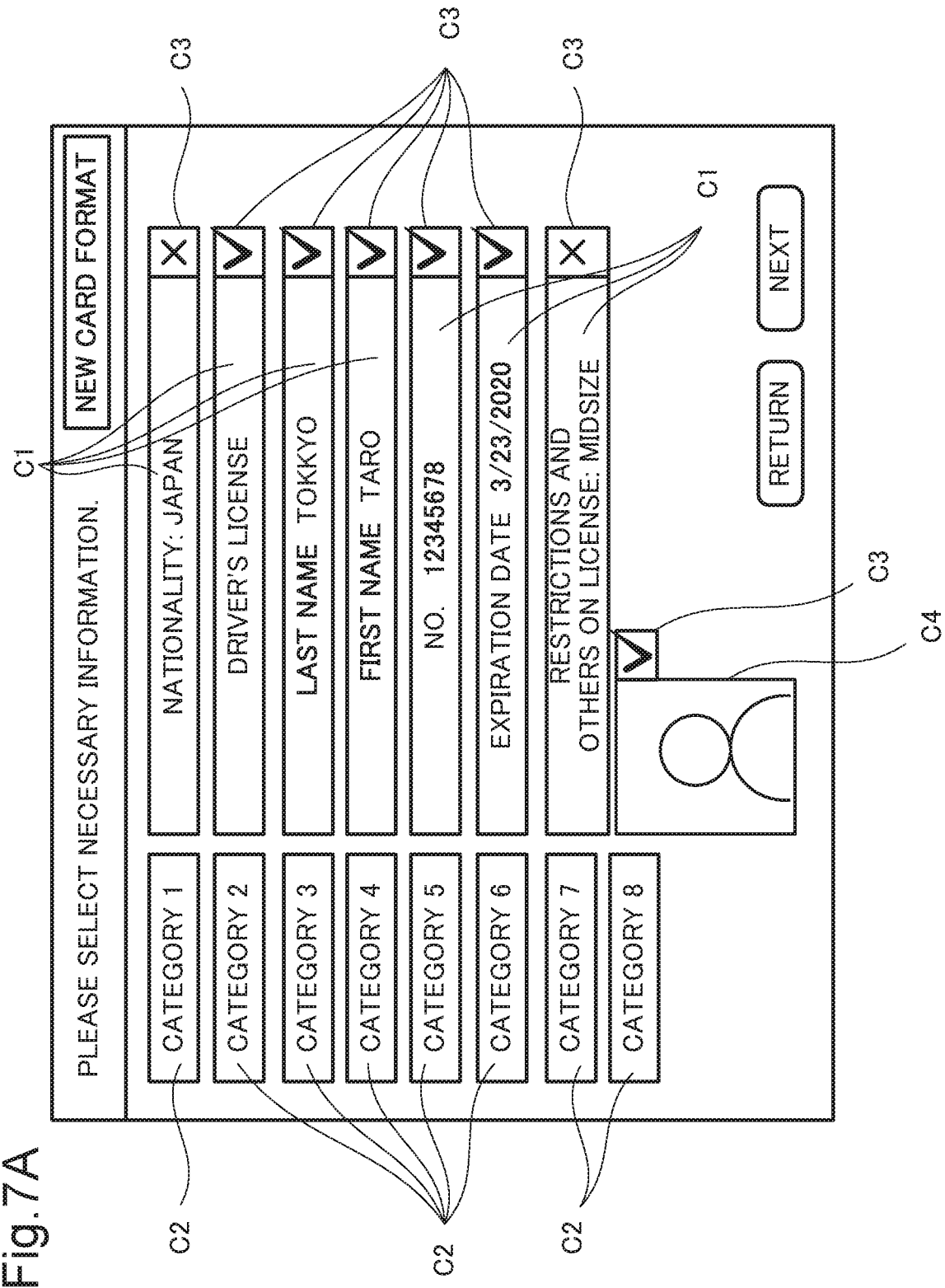

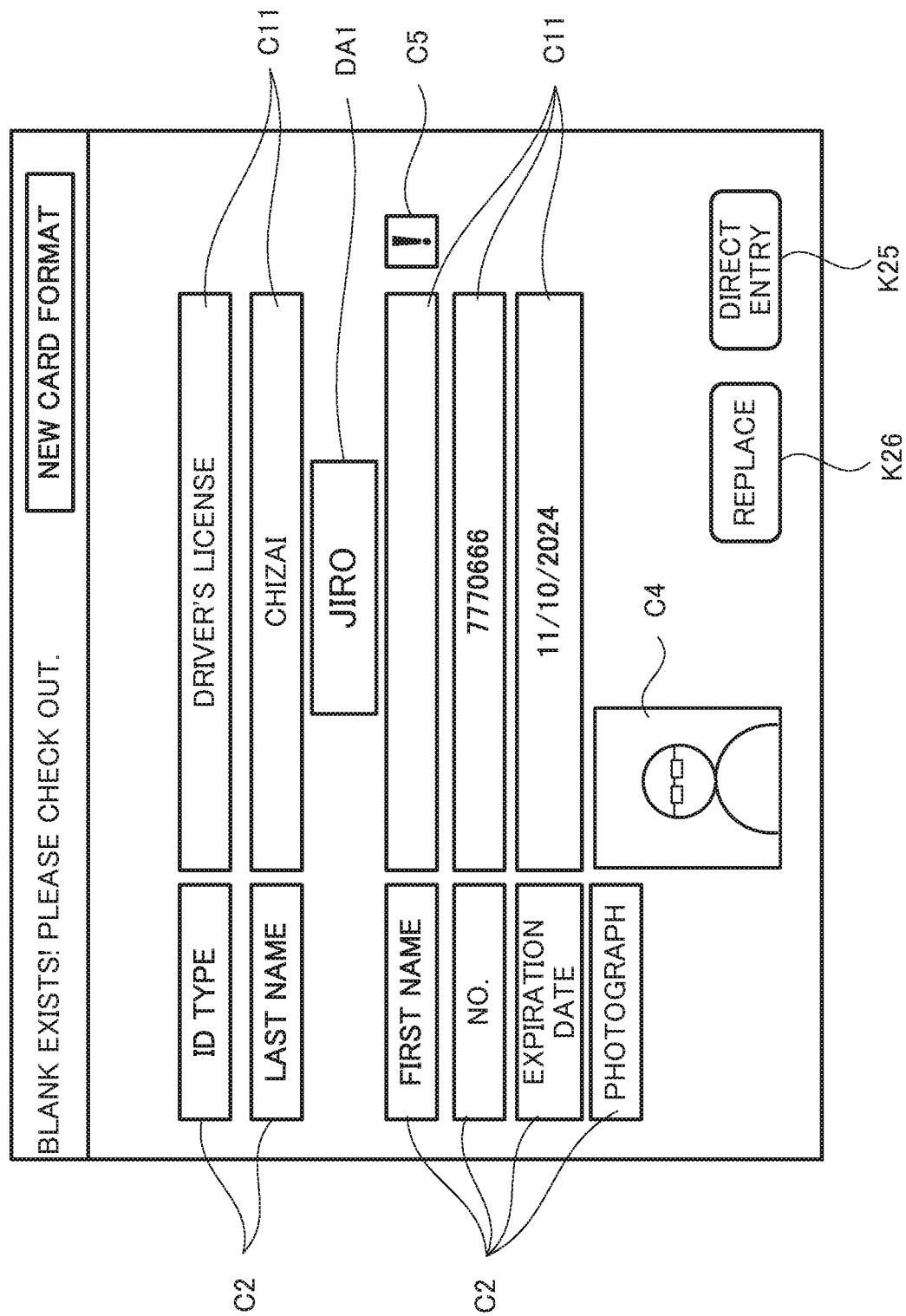

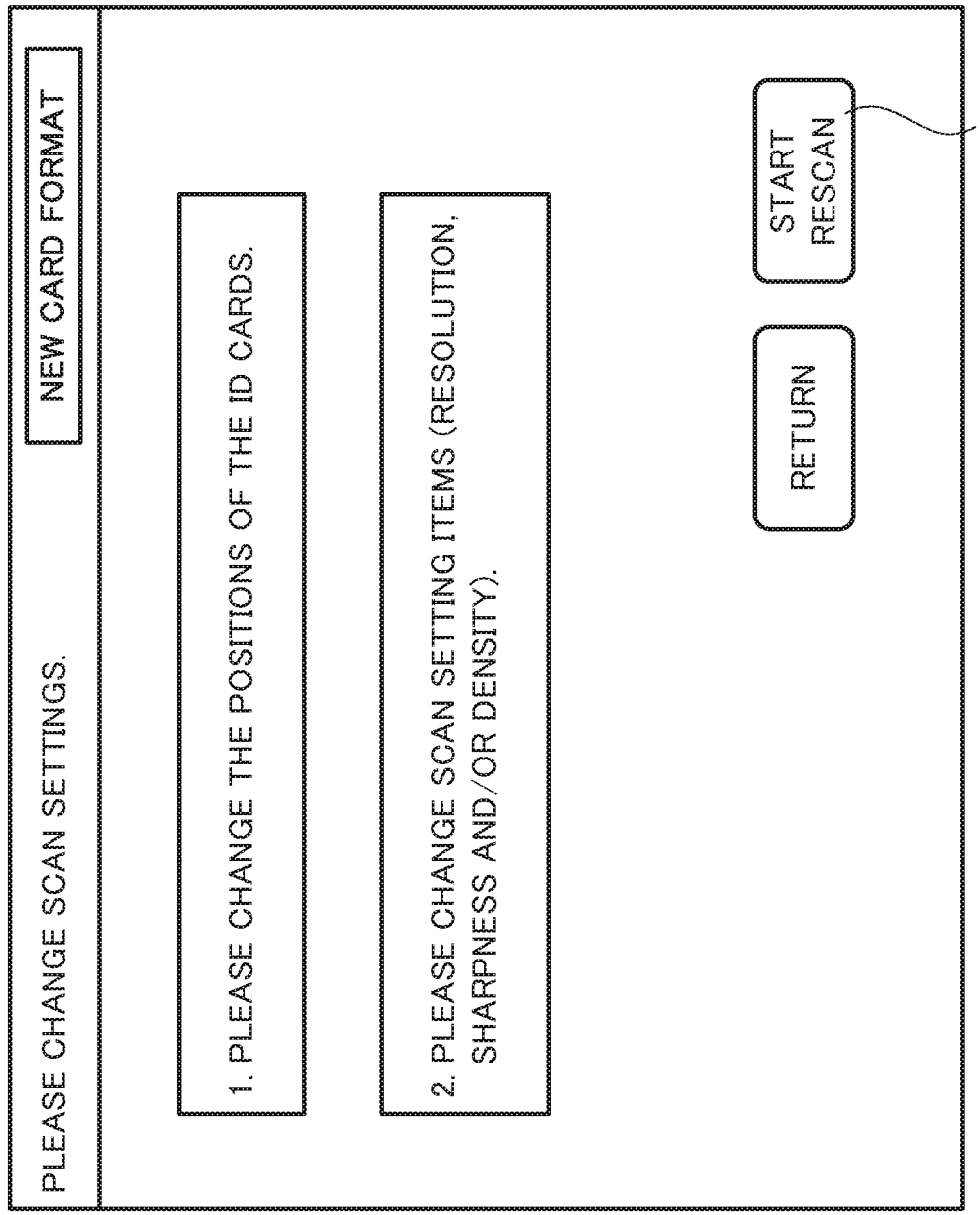

Fig. 11
| | A | B | C | D | E | F |
|---|---|---|---|---|---|---|
| | | | | LIST1 – WORKSHEET | | |
| 1 | ID TYPE | LAST NAME | FIRST NAME | NO. | EXPIRATION DATE | PHOTOGRAPH |
| 2 | DRIVER'S LICENSE | TOKKYO | TARO | 12345678 | 3/23/2020 | 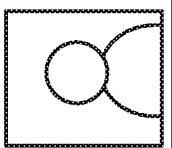 |
| 3 | DRIVER'S LICENSE | CHIZAI | JIRO | 7770666 | 11/10/2024 | 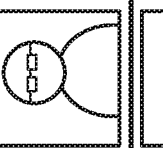 |
| 4 | HEALTH INSURANCE CARD | ISHO | HANAKO | 99-555333 | 8/31/2019 | 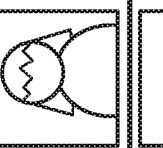 |
| 5 | IDENTITY CARD | SHOHYO | SABURO | AO-123456 | 12/31/2025 | 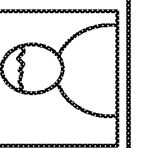 |

IMAGE FORMING APPARATUS FOR READING PLURAL DOCUMENTS PLACED ON DOCUMENT SUPPORT SURFACE AND ACQUIRING CHARACTERS FROM IMAGES OF READ DOCUMENTS

INCORPORATION BY REFERENCE

This application claims priority to Japanese Patent Application No. 2019-110503 filed on Jun. 13, 2019, the entire contents of which are incorporated by reference herein.

BACKGROUND

The present disclosure relates to image forming apparatuses and particularly relates to a technique for reading a plurality of original documents placed on a document support surface, such as a platen glass.

Some types of image forming apparatuses have a function (a so-called multi-crop function) to read a plurality of original documents placed on a document support surface (for example, a platen glass) in a batch and automatically cut out, from the obtained image, separate individual images of the original documents.

There is known a technique for using the above function to allow an image forming apparatus to read a plurality of name cards placed on a document support surface and manage the read name cards. In the image forming apparatus using this technique, it is possible to analyze the images of the plurality of read name cards, generate individual pieces of name card data containing text data from the analyzed images of the name cards, and manage these pieces of name card data as a database.

SUMMARY

A technique improved over the aforementioned technique is proposed as one aspect of the present disclosure.

An image forming apparatus according to an aspect of the present disclosure includes a document reading device, a storage device, a control device, and a document data storage. The document reading device is capable of reading a plurality of original documents placed on a document support surface in a batch by a single read job. The storage device stores a table in which each of type names representing individual types of original documents is associated with a plurality of item names previously set for the individual type of original document. The control device includes a processor and functions, through the processor executing a control program, as an individual image cut-outer, a character recognizer, a document determiner, an acquirer, and a data generator. The individual image cutouter performs processing for cutting out, from image data obtained by reading of the plurality of original documents by the document reading device, separate individual images of the original documents. The character recognizer recognizes, for each of the individual images cut out by the individual image cutouter, characters contained in a piece of image data on the individual image. The document determiner determines, for each of the individual images, whether or not the characters recognized from the individual image by the character recognizer contain the type name shown in the table stored in the storage device. Upon determination of the document determiner that the characters recognized from the individual image by the character recognizer contain the type name, the acquirer acquires, from the characters of the individual image determined to contain the type name, a plurality of informative character strings associated one-to-one with the plurality of item names shown in the table stored in the storage device. The data generator generates, for each of the individual images, a piece of document data in which the type name determined by the document determiner is associated with the plurality of informative character strings acquired by the acquirer. The document data storage stores the pieces of document data generated one for each of the individual images by the data generator.

BRIEF DESCRIPTION OF THE DRAWINGS

FIG. 4A is a view showing an example of a display screen of a display device of the image forming apparatus.

FIGS. 7A and 7B are views showing examples of a setting screen.

FIG. 9A is a view showing an example of a confirmation screen when a blank field exists.

FIG. 9B is a view showing an example of a screen for changing scan settings.

FIG. 11 is a view showing an example of a list of pieces of document data.

DETAILED DESCRIPTION

Figure 1:
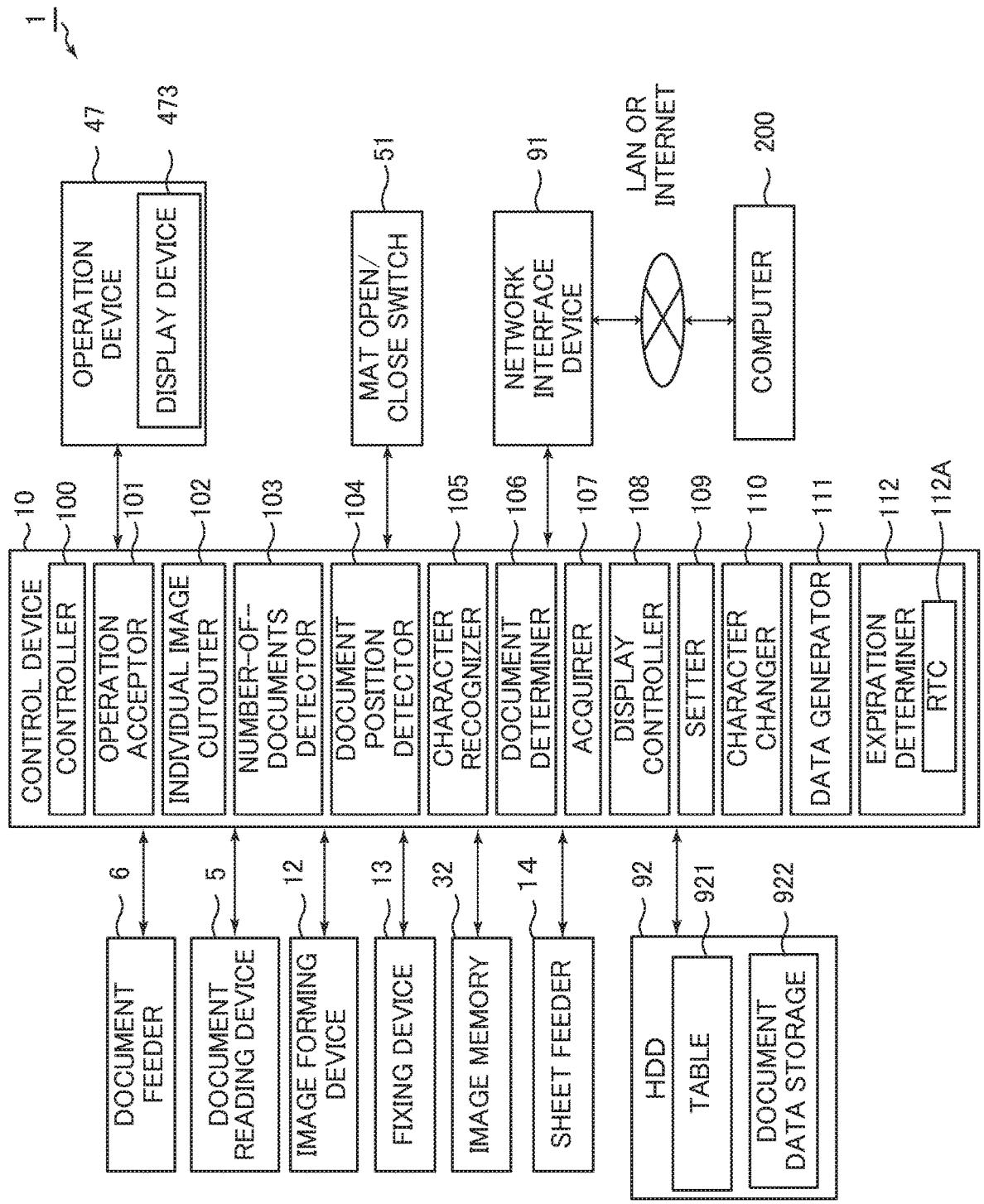
FIG. 1 is a functional block diagram schematically showing an essential internal configuration of an image forming apparatus according to a first embodiment of the present disclosure.
Figure 2:
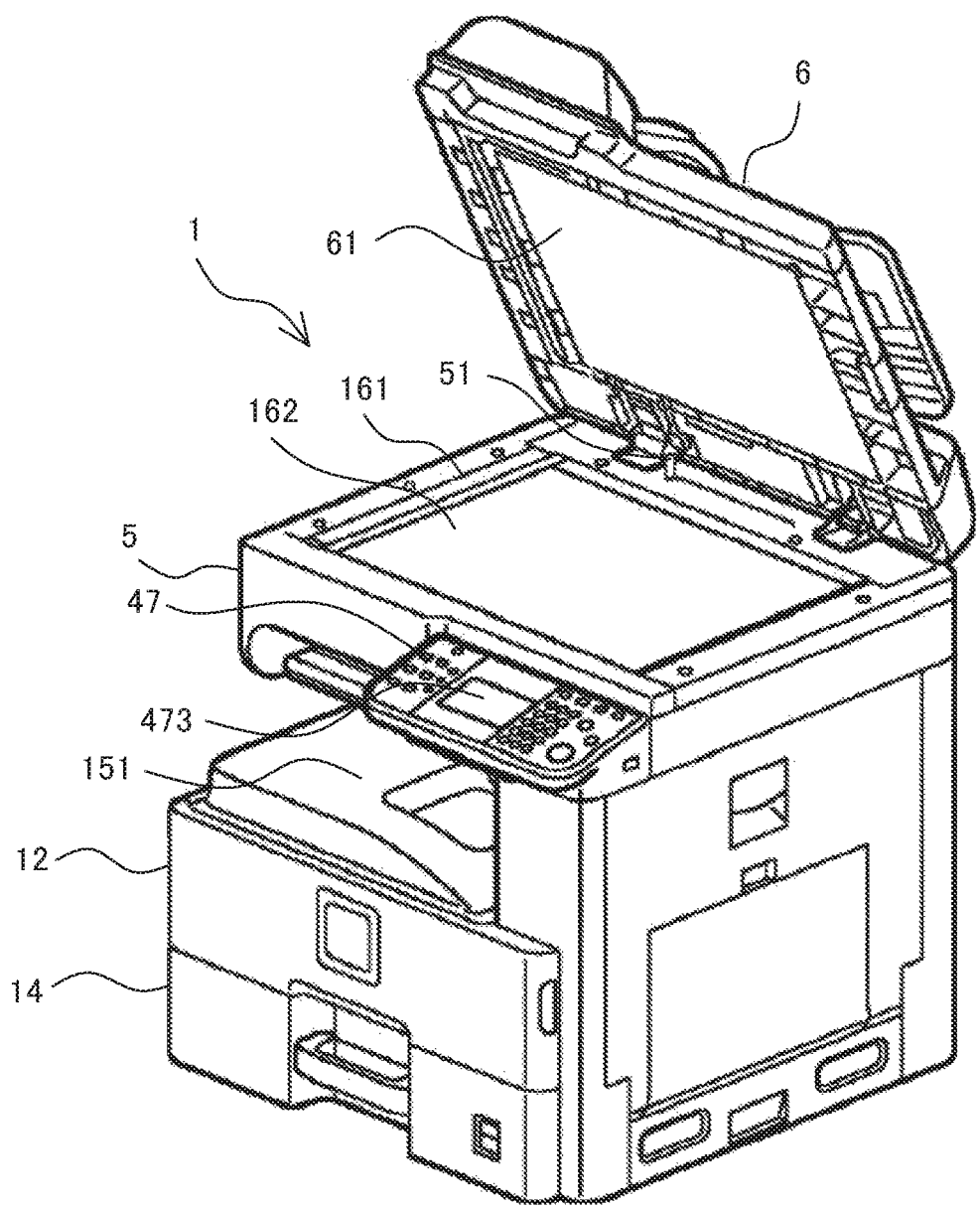
FIG. 2 is a perspective view showing an appearance of the image forming apparatus according to the first embodiment.

Hereinafter, a description will be given of an image forming apparatus according to an embodiment of the present disclosure with reference to the drawings. FIG. 1 is a functional block diagram schematically showing an essential internal configuration of an image forming apparatus according to a first embodiment of the present disclosure. FIG. 2 is a perspective view showing an appearance of the image forming apparatus according to the first embodiment.

The image forming apparatus 1 is a multifunction peripheral having multiple functions including, for example, a copy function, a print function, a scan function, and a facsimile function, and is made up by including a control device 10, a document feeder 6, a document reading device 5, an image forming device 12, an image memory 32, an HDD (hard disk drive) 92, a fixing device 13, a sheet feeder 14, an operation device 47, a mat open/close switch 51, and a network interface device 91.

A description will be given of the case where a document reading operation is performed on the image forming apparatus 1. The document reading device 5 optically reads an image of an original document being conveyed by the document feeder 6 and passing through a platen glass 161 for document conveyance and reading or an image of an original document placed on a platen glass 162 for document placement and reading and generates image data from the read image. The image data generated by the document reading device 5 is saved in the image memory 32 or the like. Furthermore, the document reading device 5 is capable of reading a plurality of original documents placed on the platen glass 162 for document placement and reading in a batch. The platen glass 162 for document placement and reading is an example of the document support surface defined in What is claimed is.

The document feeder 6 is mounted by hinges or the like on a top surface of the document reading device 5 and is thus openable and closable to the top surface of the document reading device 5. The document feeder 6 includes a document mat 61 and the document mat 61 functions as a document holder cover during reading of one or more original documents placed on the platen glass 162 for document placement and reading. The document reading device 5 is provided with the mat open/close switch 51 for use in detecting the opening or closing of the document mat 61.

Next, a description will be given of the case where an image forming operation is performed on the image forming apparatus 1. The image forming device 12 forms a toner image on a recording paper sheet as a recording medium fed from the sheet feeder 14, based on image data stored on the HDD 92, image data received from a network-connected external device, such as a personal computer 200, or other types of image data.

The HDD 92 is a large storage device that stores document images read by the document reading device 5 and other types of data. The image memory 32 is a region for use in storing image data on an original document obtained by the reading by the document reading device 5 and for use in temporarily storing data to be printed by the image forming device 12.

The fixing device 13 fixes the toner image on the recording paper sheet by the application of heat and pressure and the recording paper sheet subjected to this fixation processing is discharged to a sheet output tray 151. The sheet feeder 14 includes one or more sheet feed cassettes.

The operation device 47 accepts user's instructions for various types of operations and processing executable by the image forming apparatus 1, such as an instruction to execute an image forming operation. The operation device 47 includes a display device 473 that displays operation guidance and other types of information for the users. A touch panel is disposed on the front of the display screen of the display device 473. The touch panel detects a user's touch gesture on a button or key displayed on the display screen of the display device 473 and outputs a detection signal indicating detection of the touch gesture to a below-described controller 100. Thus, the users can operate the image forming apparatus 1 with the touch of the display device 473.

The network interface device 91 is constituted by a communication module, such as a LAN board, and transfers various data, via a LAN or the like connected to the network interface device 91, to and from a host computer 20 on the LAN or the Internet.

The control device 10 is made up by including a processor, a RAM (random access memory), a ROM (read only memory), and a dedicated hardware circuit. The processor is, for example, a CPU (central processing unit), an ASIC (application specific integrated circuit) or an MPU (micro processing unit). The control device 10 includes a controller 100, an operation acceptor 101, an individual image cutouter 102, a number-of-documents detector 103, a document position detector 104, a character recognizer 105, a document determiner 106, an acquirer 107, a display controller 108, a setter 109, a character changer 110, a data generator 111, and an expiration determiner 112.

When the above processor operates in accordance with a control program stored on the HDD 92, the control device 10 functions as the controller 100, the operation acceptor 101, the individual image cutouter 102, the number-of-documents detector 103, the document position detector 104, the character recognizer 105, the document determiner 106, the acquirer 107, the display controller 108, the setter 109, the character changer 110, the data generator 111, and the expiration determiner 112. Alternatively, each of the controller 100 and the other components of the control device 10 may not be implemented by the operation of the processor in accordance with the control program, but may be constituted by a hardware circuit. Hereinafter, the same applies to the other embodiments unless otherwise stated.

The controller 100 governs the overall operation control of the image forming apparatus 1. The controller 100 is connected to the document feeder 6, the document reading device 5, the image forming device 12, the image memory 32, the HDD 92, the fixing device 13, the sheet feeder 14, the operation device 47, the mat open/close switch 51, and the network interface device 91 and controls the operations of these components.

The operation acceptor 101 accepts a user's input of an operation through the operation device 47.

The individual image cutouter 102 performs processing for cutting out, from image data obtained by reading of one or more original documents by the document reading device 5, separate individual images of the original documents. For example, the individual image cutouter 102 executes processing for detecting edges in the image data obtained by reading by the document reading device 5, thus detecting edge images. Then, the individual image cutouter 102 cuts out, from the image data which has been obtained by reading of the original documents by the document reading device 5 and from which the edge images have been detected, rectangular images, each surrounded on all four sides by an edge image and forming a unity, as individual images.

The number-of-documents detector 103 detects, based on the individual images cut out by the individual image cutouter 102, the number N of original documents corresponding to the respective individual images. For example, the number-of-documents detector 103 detects as the number N of original documents the number of individual images cut out by the individual image cutouter 102 from the image data obtained by reading by the document reading device 5. Thus, the number-of-documents detector 103 detects the number N of original documents placed on the platen glass 162 for document placement and reading.

The document position detector 104 detects, from the image data obtained by reading by the document reading device 5, the positions of the individual images cut out by the individual image cutouter 102. For example, the document position detector 104 calculates the positions of the individual images from the respective coordinates of the individual images on the image data obtained by reading by the document reading device 5. In this embodiment, the document position detector 104 detects as the position of each individual image the center position of the individual image (for example, the center position of a rectangular individual image is a position where its diagonal lines cross).

Figure 3A:
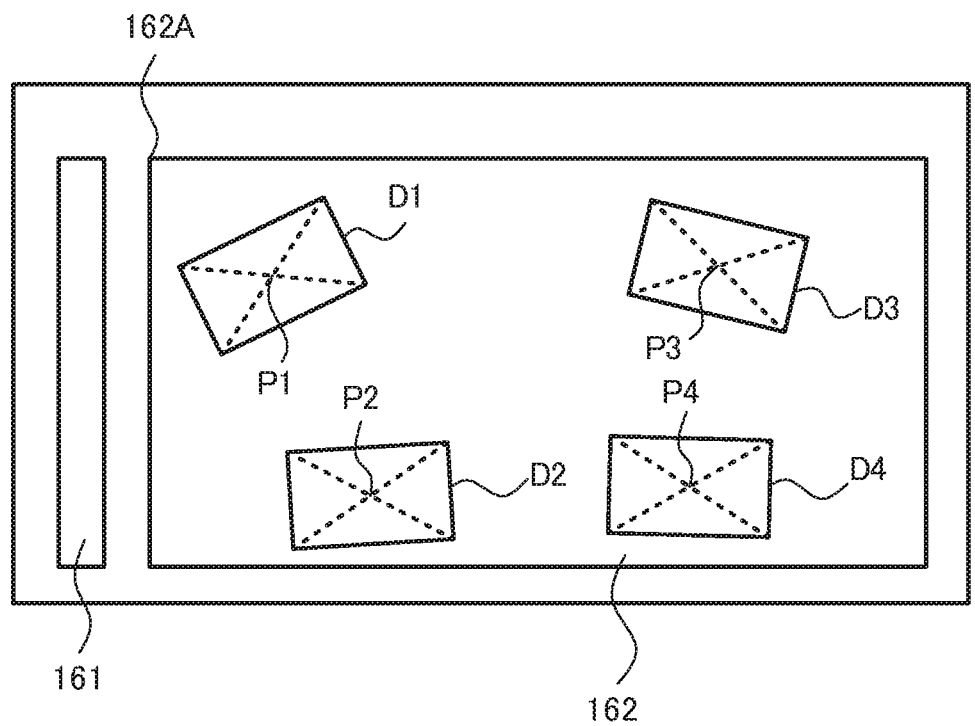
FIG. 3A is a top view showing a state where a plurality of original documents are placed on a platen glass for document placement and reading.

FIG. 3A is a top view showing a state where a plurality of original documents are placed on the platen glass 162 for document placement and reading. As shown in FIG. 3A, in the case where four original documents D1 to D4 (for example, so-called ID cards, including a driver's license, an identity card, and a health insurance card) are placed on the platen glass 162 for document placement and reading, the respective center positions of the individual images corresponding to the original documents D1 to D4 are detected as positions P1 to P4 of the original documents D1 to D4 by the document position detector 104. In this embodiment, an example is taken where relatively small ID cards, including the above-mentioned driver's license, identity card, and health insurance card, are used as the original documents in What is claimed is.

Figure 3B:
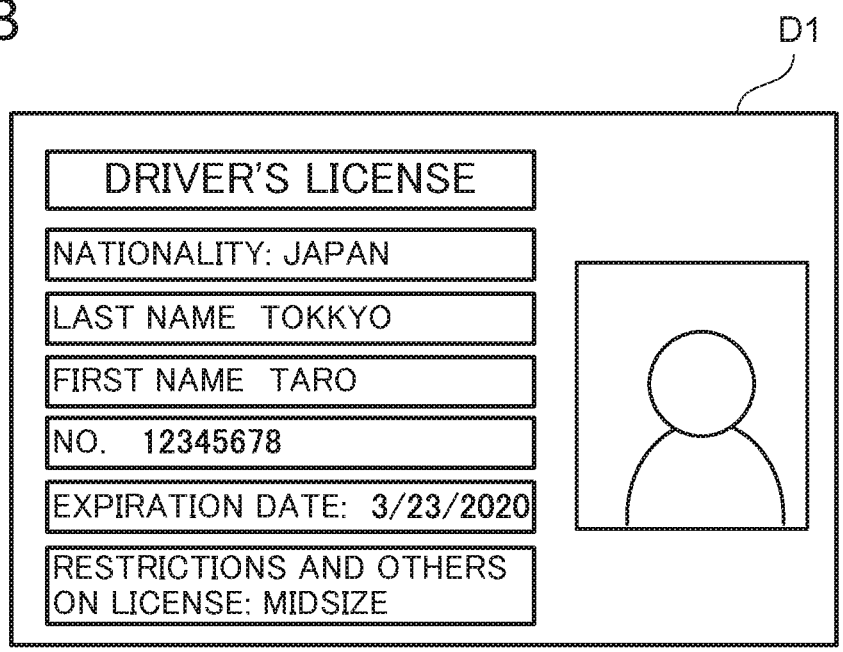
FIG. 3B is a view showing a driver's license as an example of an original document.

For example, the original document D1 is a driver's license shown in FIG. 3B. FIG. 3B is a view showing a driver's license as an example of an original document. The driver's license shown in FIG. 3B contains various types of textual information, including "DRIVER'S LICENSE", "Nationality: Japan", "Last Name: TOKKYO", "First Name: TARO", "No. 12345678", "Expiration Date: Mar. 23, 2020", and "Restrictions and Others on License: Midsize", and a photographic image of a licensed person.

The character recognizer 105 recognizes, for each individual image cut out by the individual image cutouter 102, characters contained in a piece of image data on the individual image. For example, the character recognizer 105 uses an OCR (optical character recognition) technique to convert character images contained in the individual image to text data (character data) on a character-by-character basis. The character recognizer 105 determines, using a known technique, the direction of the characters converted in the above manner.

Furthermore, the character recognizer 105 subjects the individual images in the image data obtained by reading by the document reading device 5 to character recognition in a predetermined order of individual images based on the positions of the individual images detected by the document position detector 104, beginning with the individual image nearest to a predetermined position in the image data (for example, the left rear corner 162A of the platen glass 162 for document placement and reading).

For example, in the case where a plurality of documents D1 to D4 are placed on the platen glass 162 for document placement and reading as shown in FIG. 3A, the character recognizer 105 first recognizes characters of the original document D1 corresponding to the individual image located at a position in the image data obtained by reading by the document reading device 5, the position corresponding to a nearest position (position P1) to the left rear corner 162A of the platen glass 162 for document placement and reading, and then recognizes characters of the original documents D2, D3, and D4 in this order.

The HDD 92 stores a table 921 in which each of type names representing individual types of original documents is associated with a plurality of item names previously set for the individual type of original document. The HDD 92 is an example of the storage device defined in What is claimed is.

The document determiner 106 determines, for each individual image, whether or not the characters recognized for the individual image by the character recognizer 105 contain a type name shown in the table 921 stored on the HDD 92. For example, in the case where the table 921 stores "DRIVER'S LICENSE" and "IDENTITY CARD" as type names, the document determiner 106 determines, for each individual image, whether or not the characters recognized from the individual image by the character recognizer 105 contain either "DRIVER'S LICENSE" or "IDENTITY CARD" as a type name.

When the document determiner 106 determines that the characters recognized from the individual image by the character recognizer 105 contain a type name, the acquirer 107 acquires, from the characters of the individual image determined to contain the type name by the document determiner 106, a plurality of informative character strings associated one-to-one with the plurality of item names shown in the table 921. The term "informative character string" as used in this embodiment refers to a single or two or more characters, or in other words, a character string, associated with an item name.

The display controller 108 allows the display device 473 to display, in a setting mode for setting the contents of the table 921, a below-described setting screen shown in FIG. 7A. The setting screen shown in FIG. 7A contains: recognized character display fields C1 in each of which a subset of characters recognized by the character recognizer 105 are displayed; category display fields C2 which are provided one for each of the recognized character display fields C1 and into each of which an identification name or an item name can be entered; and necessity specification fields C3 which are provided one for each of the recognized character display fields C1 and in each of which a specification of whether or not the subset of characters displayed in the recognized character display field C1 are to be stored is accepted.

When, in the setting mode, the operation acceptor 101 accepts an operation in which an identification name is entered into the category display field C2 in the necessity specification field C3 associated with which the displayed subset of characters are specified to be stored and item names are entered into the category display fields C2 in the necessity specification fields C3 associated with which the displayed subsets of characters are specified to be stored, and then the operation acceptor 101 accepts an instruction for storage into the table 921, the setter 109 sets the content displayed in the recognized character display field C1 associated with the category display field C2 in which the identification name has been entered to a type name for the table 921, and sets the item names in the category display fields C2 to item names for the table 921.

Furthermore, in a confirmation mode for allowing the user to confirm a plurality of informative character strings associated with the plurality of item names and acquired by the acquirer 107, the display controller 108 allows the display device 473 to display a confirmation screen (see FIG. 9A) containing a plurality of category display fields C2 and a plurality of informative character string display fields C11 which are associated one-to-one with the plurality of category display fields C2 and in which the plurality of respective informative character strings acquired by the acquirer 107 are displayed. For example, as shown in FIG. 9A, an informative character string "CHIZAI" is displayed in the informative character string display field C11 associated with the category display field C2 containing a display of "Last Name". Also as shown in FIG. 9A, the plurality of category display fields C2 include an expiration date item display field representing an item for an expiration date (i.e., a category display field C2 containing a display of "Expiration Date").

The character changer 110 changes, in the confirmation mode, one or more of the informative character strings in the individual informative character string display fields C11 on the confirmation screen in accordance with an operation accepted by the operation acceptor 101.

The data generator 111 generates, for each individual image, a piece of document data in which the type name determined by the document determiner 106 is associated with the plurality of informative character strings acquired by the acquirer 107. The document data is data in a data format for use in spread sheet software and examples include a standard worksheet file and a CSV (comma-separated values) file.

Furthermore, the HDD 92 includes a document data storage 922 that stores pieces of document data generated one for each of individual images by the data generator 111. The document data storage 922 stores the pieces of document data collectively in a single standard worksheet file, but may store the pieces of document data as individual pieces of data.

When any informative character string display field C11 on the confirmation screen is blank, the display controller 108 allows the display device 473 to display a message prompting the user to rearrange the plurality of original documents placed on the platen glass 162 for document placement and reading (i.e., the document support surface) or change the setting conditions for reading by the document reading device 5.

Furthermore, when any informative character string display field C11 on the confirmation screen is blank, the display controller 102 allows the display device 473 to display an attention mark C5 notifying of the presence of a blank field on the right of the blank informative character string display field C11 and display an image in a predetermined location where an informative character string to be displayed in the blank informative character string display field C11 will be described, in a display area DA1 provided alongside of the blank informative character string display field C11.

The data generator 111 generates a piece of document data in which the type name determined by the document determiner 106, the plurality of informative character strings acquired by the acquirer 107, and one or those of the plurality of informative character strings changed by the character changer 110 are associated with each other.

The expiration determiner 112 determines, in the confirmation mode, whether or not an expiration date indicated by the informative character string displayed in the informative character string display field C11 associated with the expiration date item display field on the confirmation screen shown in FIG. 9A has been passed. FIG. 9A is a view showing an example of a confirmation screen when a blank field exists. For example, the expiration determiner 112 includes a real-time clock 112A and determines whether or not the expiration date has been passed by comparing the present time and date measured by the real-time clock 112A with the informative character string displayed in the informative character string display field C11 associated with the expiration date item display field. When the expiration determiner 112 determines that the expiration date has been passed, the display controller 108 allows the display device 473 to display an error message indicating an expiration.

In the confirmation mode, the character changer 110 can change the informative character string in any informative character string display field C11 on the confirmation screen, exclusive of the informative character string display field C11 associated with the expiration date item display field, in accordance with an operation accepted by the operation acceptor 101, but does not change the informative character string in the informative character string display field C11 associated with the expiration date item display field.

The HDD 92 previously stores predetermined similar characters that may be falsely recognized. Examples of the similar characters include a pair of an alphabetical character "O (ow)" and an Arabic number "0 (zero)" and a pair of a lower-case alphabetical character "l (el)" and an Arabic number "1 (one)".

When, in the confirmation mode, any informative character string display field C11 on the confirmation screen contains a similar character stored on the HDD 92, the display controller 108 allows the similar character to be displayed in a different display manner from the characters other than the similar character. For example, the display controller 108 allows the similar character to be displayed in a different display color from the other characters and also allows the reading of the similar character to be popped up. Alternatively, the display controller 108 may either allow the similar character to be displayed in a different display color from the other characters or allow the reading of the similar character to be popped up.

The HDD 92 also stores a plurality of mail addresses and their attendant information (including the users' names of the mail addresses). The controller 100 has the function of, when the user operates the operation device 47 to do a mail sending operation for sending a piece of document data stored in the document data storage 922 to a predetermined destination by mail and the operation acceptor 101 accepts the mail sending operation, sending the piece of document data to the destination by mail.

Figure 4B:
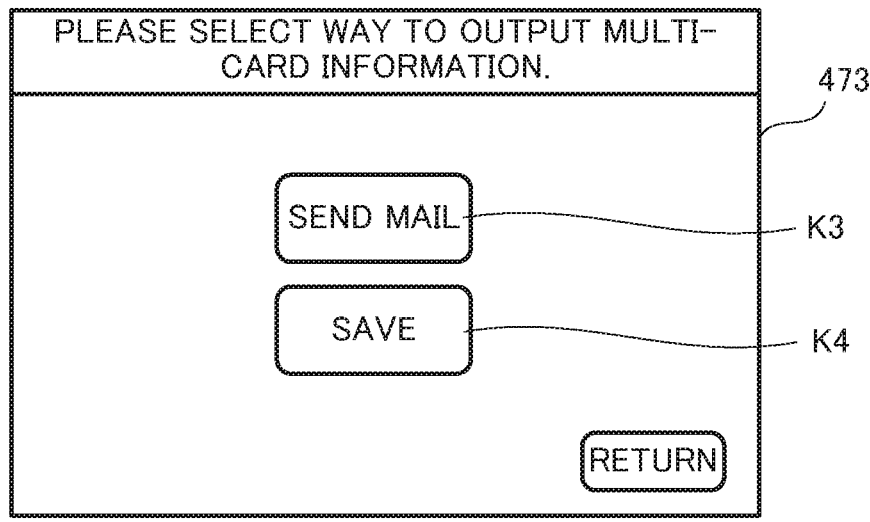
FIG. 4B is a view showing an example of a selection screen for selecting the way to output.
Figure 4C:
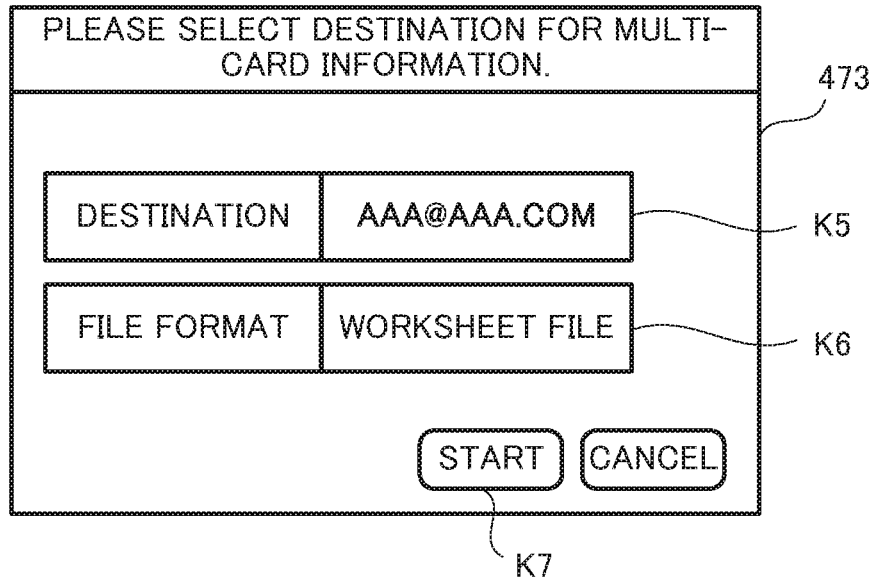
FIG. 4C is a view showing an example of a designation screen for designating a destination and a data format.
Figure 5:
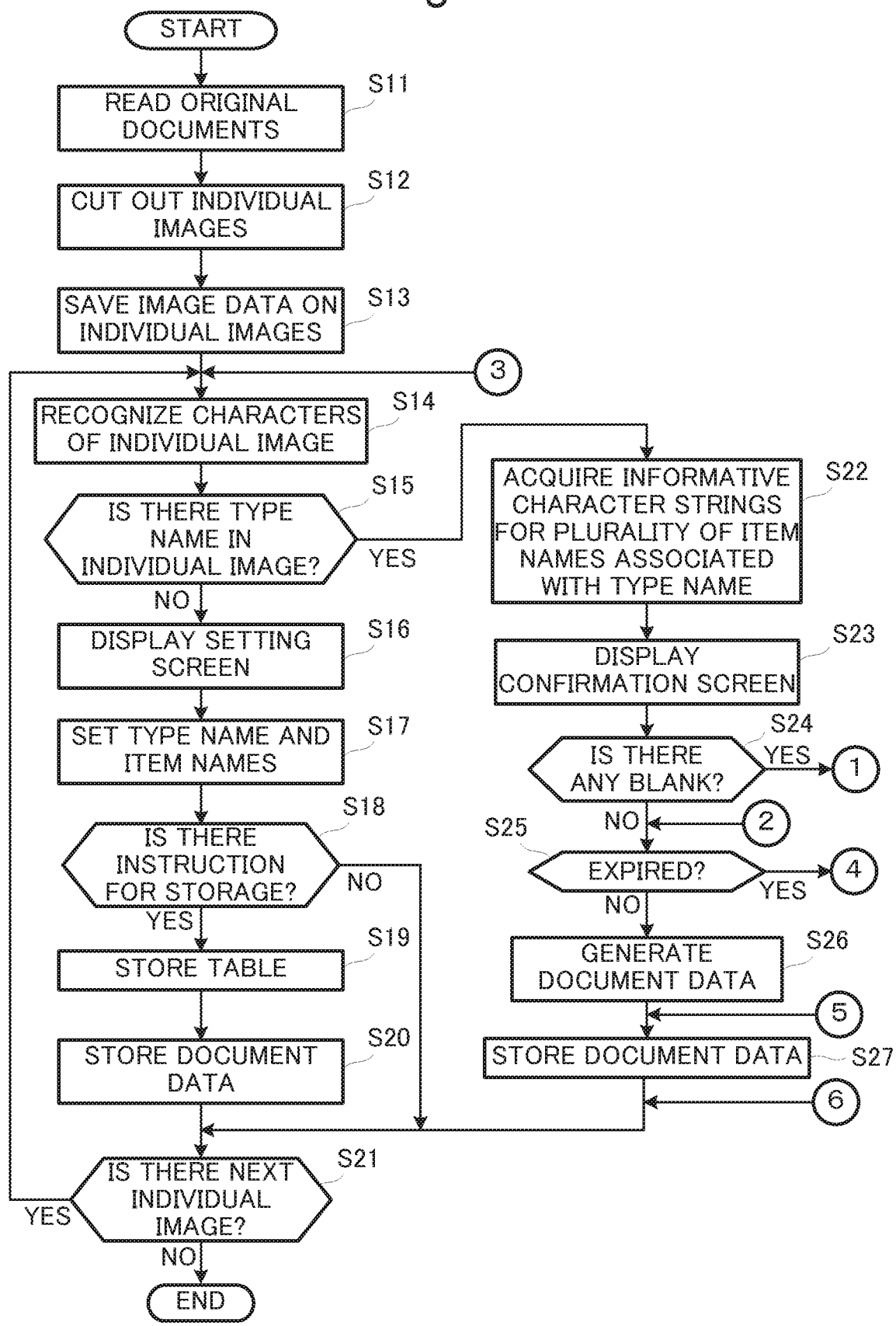
FIG. 5 is a flowchart showing an example of multi-card information gathering processing of the image forming apparatus according to the first embodiment.
Figure 6A:
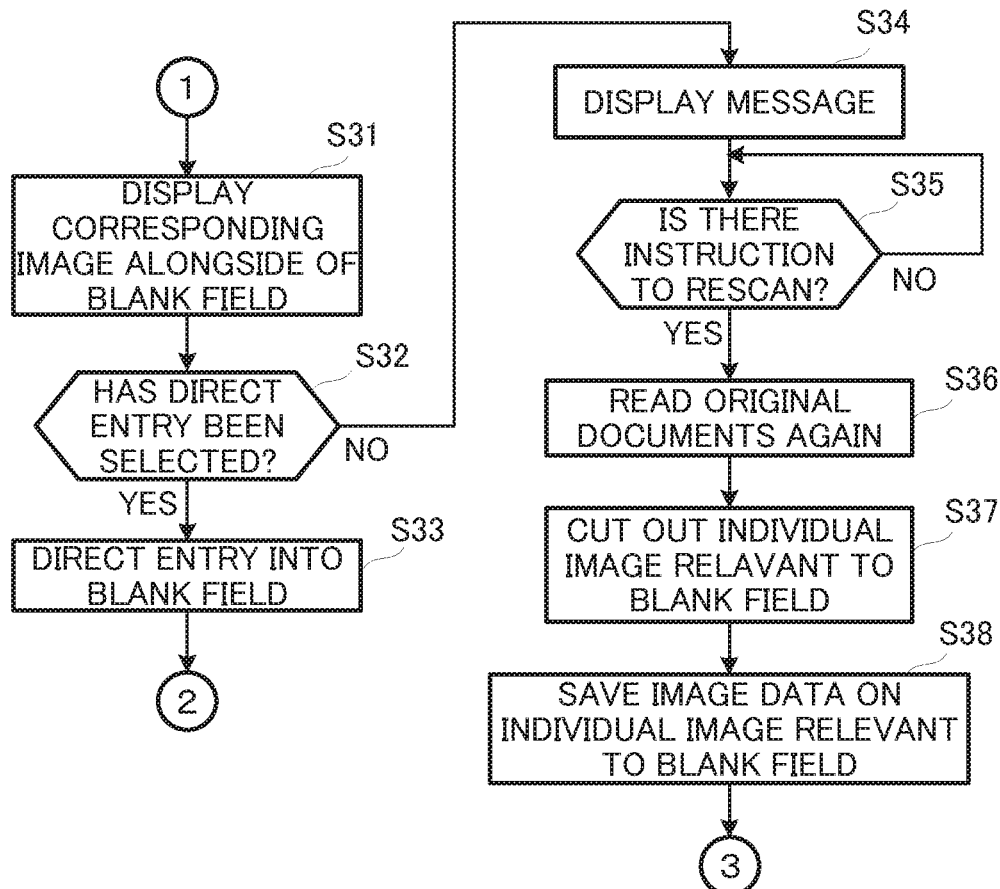
FIGS. 6A and 6B are respective flowcharts showing subsequent stages of the processing shown in FIG. 5.
Figure 6B:
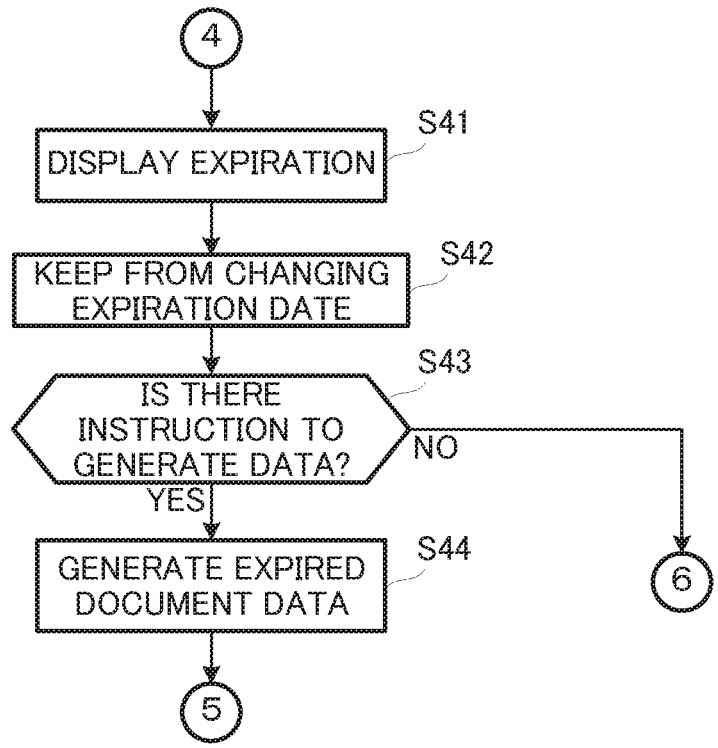

Next, a description will be given of multi-card information gathering processing of the image forming apparatus 1 according to the first embodiment with reference to the drawings. FIG. 4A is a view showing an example of a display screen of the display device of the image forming apparatus. FIG. 4B is a view showing an example of a selection screen for selecting the way to output. FIG. 4C is a view showing an example of a designation screen for designating a destination and a data format. FIG. 5 is a flowchart showing an example of multi-card information gathering processing of the image forming apparatus according to the first embodiment. FIGS. 6A and 6B are respective flowcharts showing subsequent stages of the processing shown in FIG. 5.

The multi-card information gathering processing is executed when a key K1 indicating "Multi-Card Information Gathering" displayed on the display screen of the display device 473 shown in FIG. 4A is pressed by the user, the touch panel of the display device 473 detects the pressing, and the operation acceptor 101 accepts a signal instructing the start of multi-card information gathering from the touch panel.

When the operation acceptor 101 accepts the user's instruction for multi-card information gathering, the controller 100 controls the display controller 108 to allow the display device 473 to display a selection screen for selecting the way to output multi-card information as shown in FIG. 4B. When the operation acceptor 101 accepts that a key K3 indicating "Send Mail" has been pressed by the user, the controller 100 controls the display controller 108 to allow the display device 473 to display a designation screen shown in FIG. 4C. The display controller 108 allows the display device 473 to display the designation screen containing an entry field K5 in which a destination address is to be entered and a designation field K6 in which a data format is to be designated, as shown in FIG. 4C. Then, when the operation acceptor 101 accepts the designation of a destination and a data format and accepts that a key K7 indicating "Start" has been pressed by the user, the controller 100 allows the document reading device 5 to start the reading of original documents. In this case, suppose that, as shown in FIG. 4B, the operation acceptor 101 accepts that a key K4 indicating "Save" has been pressed by the user and thus the controller 100 allows the document reading device 5 to start the reading of original documents.

When the operation acceptor 101 accepts the user's instruction for multi-card information gathering, the controller 100 allows the document reading device 5 to read original documents placed on the platen glass 162 for document placement and reading and allows the image memory 32 to store image data obtained by reading of the original documents by the document reading device 5 (S11).

Then, the individual image cutouter 102 performs processing for cutting out, from the image data obtained by reading of the original documents by the document reading device 5, separate individual images of the original documents and allows the image memory 32 to store respective pieces of image data on the cutout individual images (S12). The controller 100 allows the HDD 92 to store the respective pieces of image data on the individual images cut out by the individual image cutouter 102, thus saving the pieces of image data on the individual images (S13).

Subsequently, the number-of-documents detector 102 detects, based on the individual images cut out by the individual image cutouter 102, the number N of original documents corresponding to the individual images. In other words, the number-of-documents detector 103 detects the number N of the original documents placed on the platen glass 162 for document placement and reading. The document position detector 104 detects, from the image data obtained by reading by the document reading device 5, the positions of the individual images cut out by the individual image cutouter 102.

Based on the positions of the individual images of the plurality of original documents D1 to D4 shown in FIG. 3A, the positions having been detected by the document position detector 104, the character recognizer 105 recognizes the characters of the individual image of the original document D1 located at a nearest position (position P1) to the left rear corner 162A of the platen glass 162 for document placement and reading (S14).

Figure 7B:
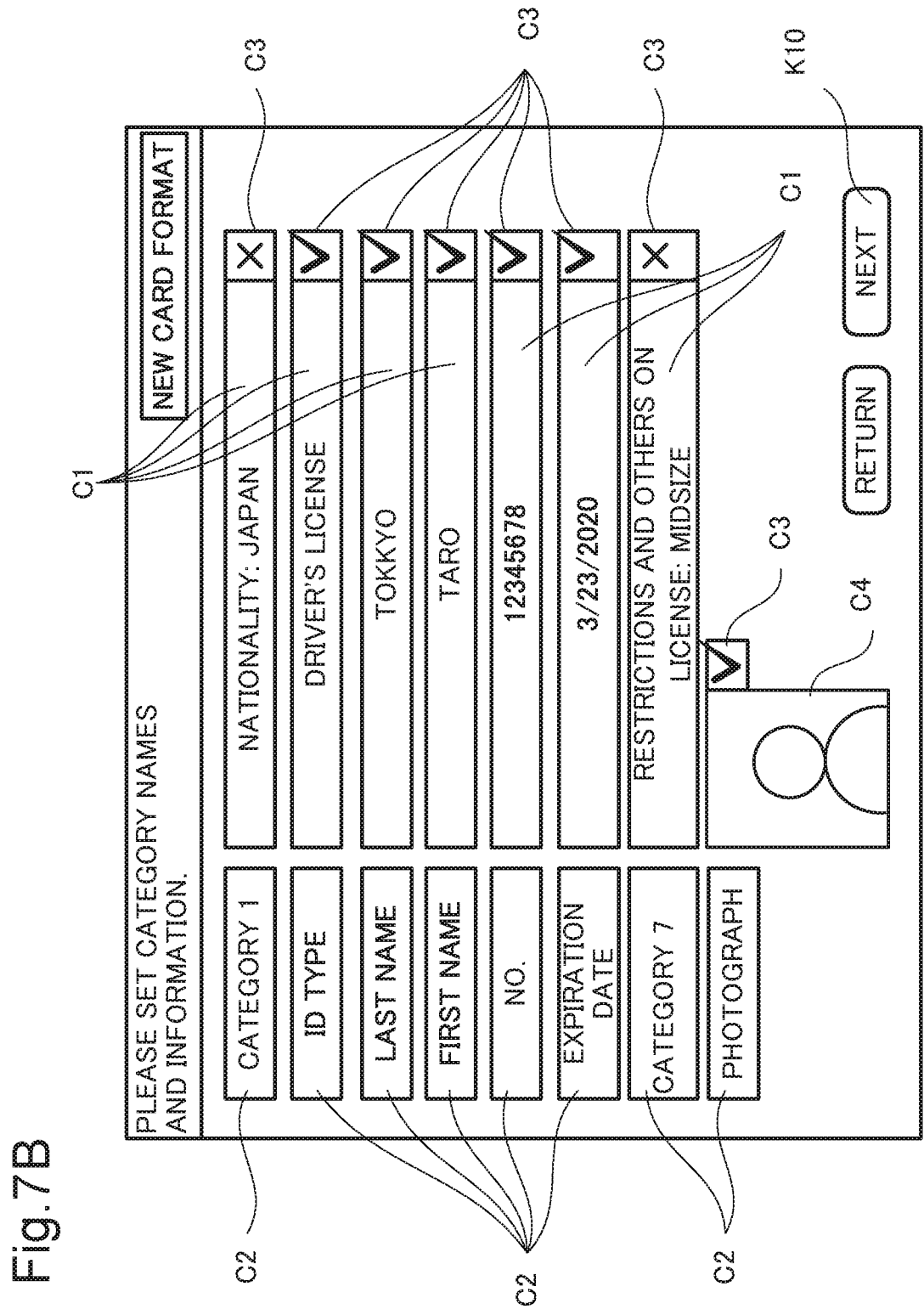

The document determiner 106 determines whether or not the characters recognized from the individual image of the original document D1 by the character recognizer 105 contain a type name shown in the table 921 (S15). In this case, suppose that the table 921 does not store a "DRIVER'S LICENSE" as a type name. Because the characters recognized from the individual image of the original document D1 by the character recognizer 105 contain the description of "DRIVER'S LICENSE" but the table 921 does not store "DRIVER'S LICENSE" as a type name, the document determiner 106 determines that the individual image of the original document D1 has no type name (NO in S15) and the display controller 108 selects a setting mode for setting contents of the table 921 and allows the display device 473 to display a setting screen shown in FIG. 7A (S16). FIGS. 7A and 7B are views showing examples of a setting screen.

Specifically, the display controller 108 allows the display device 473 to display subsets of characters including all the characters recognized from the individual image of the original document D1 by the character recognizer 105 in the respective recognized character display fields C1 on the setting screen shown in FIG. 7A. Furthermore, the controller 100 identifies a rectangular region having not been recognized as characters by the character recognizer 105, i.e., a rectangular region having not been converted to text data, as a picture image region (i.e., a region for a photographic image) and the display controller 108 allows the display device 473 to display the photographic image identified by the controller 100 in a photograph display field C4 on the setting screen shown in FIG. 7A. Alternatively, the controller 100 may identify a photographic image in the individual image using a known facial identification technique.

The setter 109 sets a type name and item names for the table 921 in accordance with the acceptance of user's touch gestures on the display device 473 by the operation acceptor 101 (S17).

Specifically, the user determines whether or not each of the recognized character display fields C1 on the setting screen shown in FIG. 7A is necessary for data management. When the user checks any or all of the necessity specification fields C3 disposed one for each of the recognized character display fields C1, the operation acceptor 101 accepts user's specification of the necessity for storage in the checked necessity specification field or fields C3. When the user places a mark "x" into any necessity specification field C3, the operation acceptor 101 accepts user's specification of non-storage in the x-marked necessity specification field C3. In FIG. 7A, instructions indicating that the recognized character display field C1 containing a display of "Nationality: Japan" and the recognized character display field C1 containing a display of "Restrictions and Others on License: Midsize" are not necessary are entered into their respective necessity specification fields C3 and instructions indicating that the respective recognized character display fields C1 containing a display of "Last Name: TOKKYO", a display of "First Name: TARO", a display of "No. 12345678", and a display of "Expiration Date: Mar. 23, 2020" are necessary are entered into their respective necessity specification fields C3. Furthermore, an instruction indicating the necessity of the photograph display field C4 is entered into the associated necessity specification field C3.

Subsequently, as for the recognized character display fields C1 containing a display of "Last Name: TOKKYO", a display of "First Name: TARO", a display of "No. 12345678", and a display of "Expiration Date: Mar. 23, 2020", the operation acceptor 101 accepts an identification name entered into a category display field C2 by the user and item names entered into other category display fields C2 by the user. The operation acceptor 101 also accepts an item name entered into the category display field C2 associated with the photograph display field C4. In FIG. 7B, based on the entry of "ID Type" as an identification name into the category display field C2 associated with the recognized character display field C1 containing a display of "DRIVER'S LICENSE", "DRIVER'S LICENSE" which is a display content displayed in the recognized character display field C1 is set as a type name, and based on the entry of "Last Name", "First Name", "No.", and "Expiration Date" into the category display fields C2 associated with the recognized character display fields C1 containing a display of "Last Name: TOKKYO", a display of "First Name: TARO", a display of "No. 12345678", and a display of "Expiration Date: Mar. 23, 2020", respectively, "Last Name", "First Name", "No.", and "Expiration Date" are set as a plurality of item names. In this case, the user changes the display contents of the recognized character display fields C1 containing a display of "Last Name: TOKKYO", a display of "First Name: TARO", a display of "No. 12345678", and a display of "Expiration Date: Mar. 23, 2020", so that the above recognized character display fields C1 are changed to those containing a display of "TOKKYO", a display of "TARO", a display of "12345678", and a display of "Mar. 23, 2020", respectively. Furthermore, "Photograph" is entered into the category display field C2 associated with the photograph display field C4.

Figure 8A:
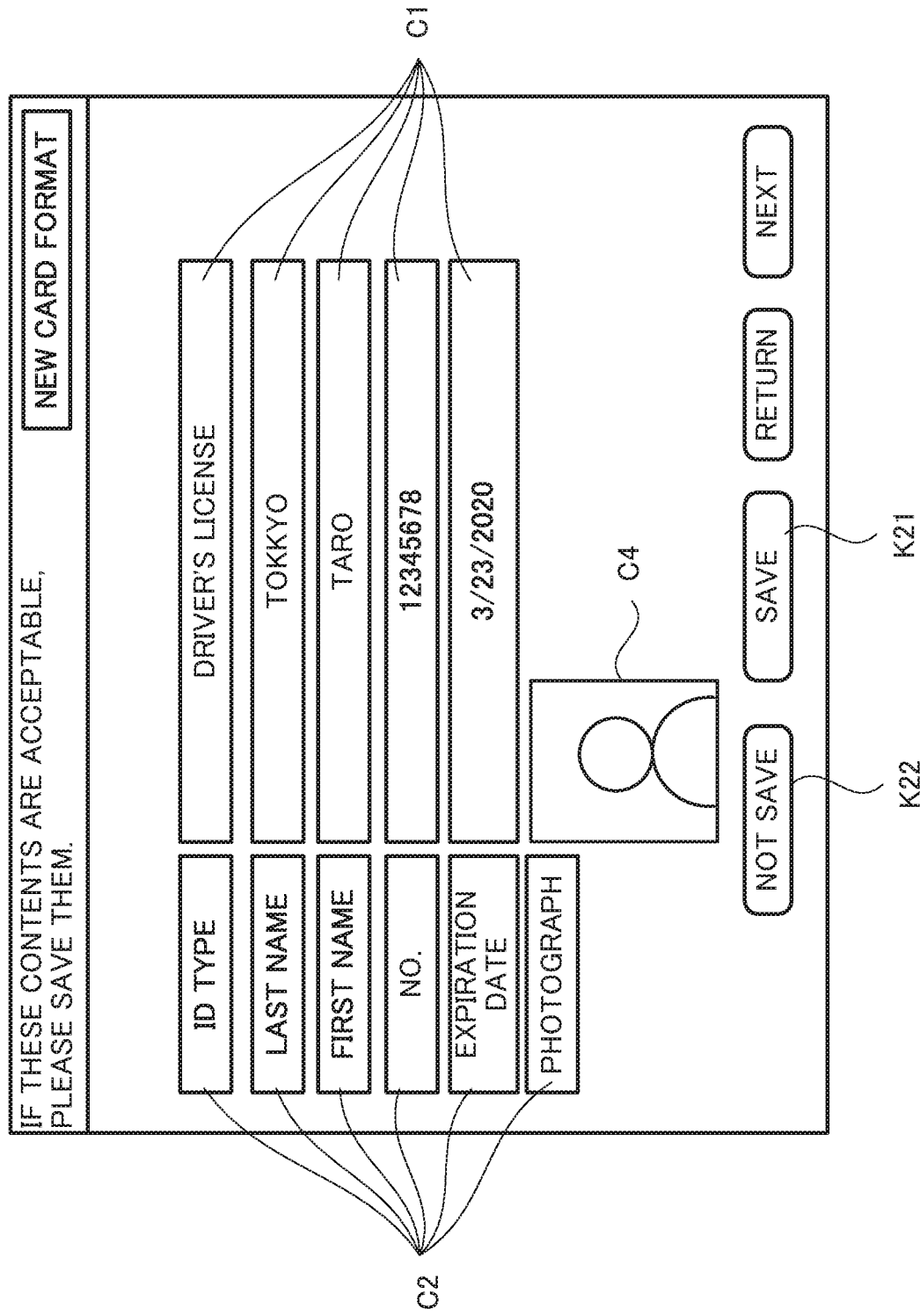
FIG. 8A is a view showing an example of a setting screen.

Subsequently, when the operation acceptor 101 accepts that a key K10 indicating "Next" on the setting screen shown in FIG. 7B has been pressed by the user, the display controller 108 allows the display device 473 to display a setting screen as shown in FIG. 8A. FIG. 8A is a view showing an example of a setting screen. For example, when, in the setting mode, the operation acceptor 101 accepts an operation in which an identification name is entered into the category display field C2 in the necessity specification field C3 associated with which the displayed subset of characters are specified to be stored and item names are entered into the category display fields C2 in the necessity specification fields C3 associated with which the displayed subsets of characters are specified to be stored, and then the operation acceptor 101 accepts an instruction for storage into the table 921, the setter 109 sets the type name in the category display field C2 to a type name for the table 921 and sets the item names in the category display fields C2 to item names for the table 921. The setting screen shown in FIG. 8A can be said to be a display screen for settings into the table 921 and can also be said to be a confirmation screen because it is a display screen for allowing the user to confirm the contents of the settings.

Figure 8B:
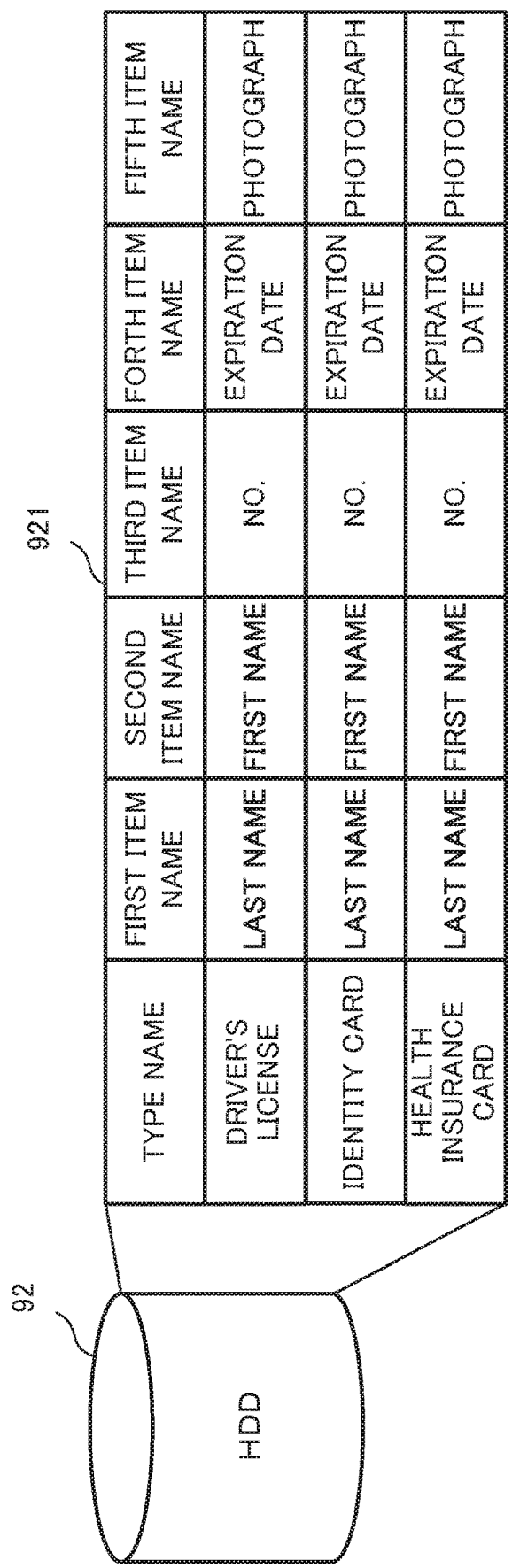
FIG. 8B is a view showing an example of table contents to be stored on an HDD.

The controller 100 determines the presence or absence of an instruction for storage (S18). Specifically, when the operation acceptor 101 accepts that a key K21 indicating "Save" on the setting screen shown in FIG. 8A has been pressed by the user (YES in S18), the controller 100 allows the HDD 92 to store the contents of settings shown in FIG. 8A, i.e., the table 921 having the contents shown in FIG. 8B (S19). FIG. 8B is a view showing an example of table contents to be stored on the HDD. In the above description, the HDD 92 stores the table 921 having the contents indicating that the type name is "DRIVER'S LICENSE" and the item names are "Last Name", "First Name", "No.", and "Expiration Date". FIG. 8B also describes table contents indicating that the type names are "IDENTITY CARD" and "HEALTH INSURANCE CARD", but these contents are added by later reading of below-described original documents D3 and D4. On the other hand, when the operation acceptor 101 accepts that a key K22 indicating "Not Save" on the setting screen shown in FIG. 8A has been pressed by the user (NO in S18), the controller 100 allows the processing to proceed to S21.

The controller 100 allows the document data storage 922 of the HDD 92 to store a piece of document data (S20). Specifically, the controller 100 allows the document data storage 922 to store a piece of document data having the contents shown in FIG. 8A, i.e., a piece of document data composed of "DRIVER'S LICENSE", "TOKKYO", "TARO", "12345678", "Mar. 23, 2020", and a photographic image.

Subsequently, the controller 100 determines the presence or absence of a next individual image (S21). In this case, the processing for the individual image of the original document D1 has only been completed and the processing for the individual images of the original documents D2 to D4 remains uncompleted. Therefore, the controller 100 determines that there is a next individual image (YES in S21) and the character recognizer 105 recognizes the characters of the individual image of the original document D2 (S14). In this case, suppose that the original document D2 is a driver's license. Furthermore, suppose that the original document D3 is a health insurance card and the original document D4 is an identity card.

The document determiner 106 determines whether or not the characters recognized from the individual image of the original document D2 by the character recognizer 105 contain a type name shown in the table 921 stored on the HDD 92 (S15). In this case, since "DRIVER'S LICENSE" has already been stored as a type name in S19, the characters recognized from the individual image of the original document D2 by the character recognizer 105 contain a description of "DRIVER'S LICENSE coincident with "DRIVER'S LICENSE" which is a type name in the table 921 and, therefore, the document determiner 106 determines that the individual image of the original document D2 has a type name (YES in S15).

When the document determiner 106 determines that the characters recognized for the individual image of the original document D2 by the character recognizer 105 contain a type name (YES in S15), the acquirer 107 acquires, from the characters in the individual image of the original document D2 determined to contain a type name, a plurality of informative character strings associated one-to-one with the plurality of item names shown in the table 921 (S22).

The display controller 108 selects the confirmation mode for allowing the user to confirm the plurality of informative character strings associated with the plurality of item names and acquired by the acquirer 107, as shown in FIG. 9A, allows the display device 473 to display a confirmation screen containing a plurality of category display fields C2 and a plurality of informative character string display fields C11 which are associated one-to-one with the plurality of category display fields C2 and in which the plurality of respective informative character strings acquired by the acquirer 107 are displayed (S23). Thus, the user can check and confirm the plurality of item names and the plurality of informative character strings associated with the plurality of item names and acquired by the acquirer.

The controller 100 determines whether or not there is any blank field among the informative character string display fields C11 on the confirmation screen (S24). For example, the controller 100 may determine the presence or absence of a blank field by determining whether or not the plurality of informative character strings acquired by the acquirer 107 contain a blank space without any character string or by detecting the presence or absence of a blank field among the informative character string display fields C11 on the confirmation screen allowed to be displayed by the display controller 108.

Furthermore, when the controller 100 determines that there is a blank filed among the informative character string display fields on the confirmation screen (YES in S24), the display controller 108 allows, as shown in FIG. 9A, the display device 473 to display an image in a predetermined location where an informative character string to be displayed in the blank informative character string display field C11 will be described (an image of "JIRO" in FIG. 9A), in a display area DA1 provided alongside of the blank informative character string display field C11 (S31 shown in FIG. 6A). Thus, the user can confirm an informative character string to be displayed in the blank informative character string display field C11.

The controller 100 determines whether or not a direct entry has been selected (S32). Specifically, when the operation acceptor 101 accepts that a key K25 indicating "Direct Entry" shown in FIG. 9A has been pressed by the user, the controller 100 determines that a direct entry has been selected (YES in S32). The operation acceptor 101 accepts characters directly entered into the blank informative character string display field C11 on the confirmation screen shown in FIG. 9A (S33). In this case, since the image of "JIRO" is displayed in the display area DA1, the user directly enters "JIRO" in the informative character string display field C11 on the display device 474 while viewing the image displayed in the display area DA1.

Thus, even if there are any number of blank informative character string display fields C11 on the confirmation screen, the user can enter a correct informative character string in each of the blank informative character string display fields C11. Furthermore, even if any informative character string display field C11 on the confirmation screen contains an error in the description, the user can correct the error. Therefore, the user can generate a piece of document data in which the informative character string in the informative character string display field C11 has been corrected.

On the other hand, when in S32 the controller 100 determines that a direct entry has not been selected (NO in S32), i.e., when the operation acceptor 101 accepts that a key K26 indicating "Replace" shown in FIG. 9A has been pressed by the user, the controller 100 allows the display device 473 to display a message (S34), as shown in FIG. 9B. FIG. 9B is a view showing an example of a screen for changing scan settings.

When the controller 100 determines that there is a blank field among the informative character string display fields C11 on the confirmation screen (YES in S24) and determines that a direct entry has not been selected (NO in S32), the display controller 108 allows the display device 473 to display the message (S34). Specifically, the display controller 108 allows the display device 473 to display a message shown in FIG. 9B. The message shown in FIG. 9B is a message prompting the user to rearrange the plurality of original documents placed on the platen glass 162 for document placement and reading (i.e., the document support surface) or change the setting conditions for reading by the document reading device 5.

The controller 100 determines the presence or absence of an instruction to rescan (S35). Specifically, when the operation acceptor 101 accepts that a key K31 indicating "Start Rescan" shown in FIG. 9B has been pressed by the user, the controller 100 determines that there is an instruction to rescan (YES in S35).

When determining that there is an instruction to rescan (YES in S35), the controller 100 allows the document reading device 5 to read the original documents placed on the platen glass 162 for document placement and reading and allows the image memory 32 to store image data obtained by reading of the original documents by the document reading device 5 (S36).

Then, the individual image cutouter 102 performs processing for cutting out, from the image data obtained by reading of the original documents by the document reading device 5, an individual image of the original document D2 relevant to the blank field and allows the image memory 32 to store a piece of image data on the cutout individual image of the original document D2 (S37). The controller 100 allows the HDD 92 to store the piece of image data on the individual image of the original document D2 relevant to the blank field cut out by the individual image cutouter 102 (S38). After the processing step in S38, the controller 100 allows the processing to proceed to S14.

On the other hand, when in S24 the controller 100 determines that there is no blank field among the informative character string display fields C11 on the confirmation screen (NO in S24), the expiration determiner 112 determines, in the confirmation mode, whether or not an expiration date indicated by the informative character string displayed in the informative character string display field C11 associated with the expiration date item display field on the confirmation screen shown in FIG. 9A has been passed (S25).

Figure 10A:
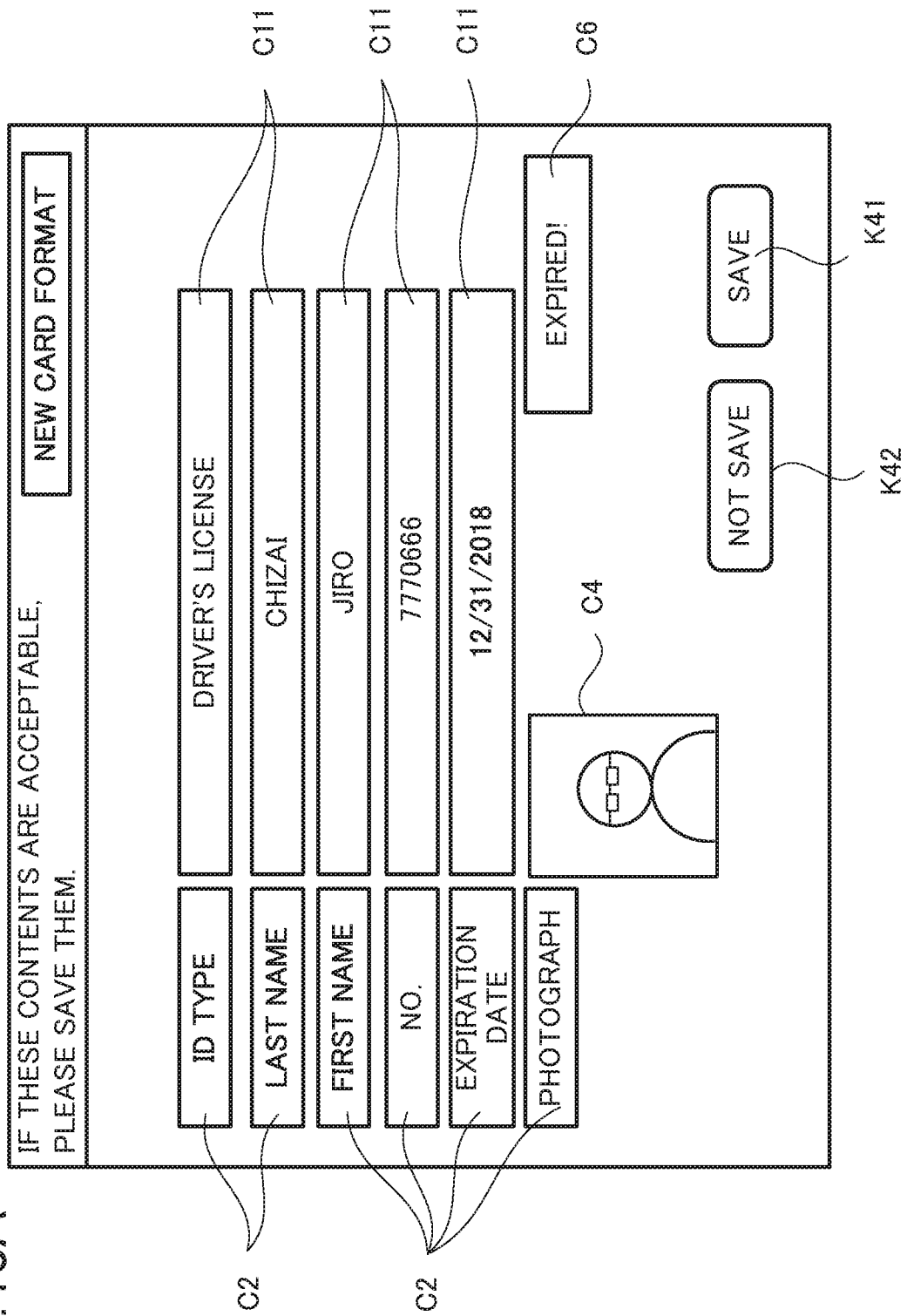
FIG. 10A is a view showing an example of a confirmation screen in the case of expiration.

When the expiration determiner 112 determines that the expiration date has been passed (YES in S25), the display controller 108 allows, as shown in FIG. 10A, the display device 473 to display an error message C6 indicating an expiration (S41 shown in FIG. 6B). FIG. 10A is a view showing an example of a confirmation screen in the case of expiration. Thus, the user can confirm whether the document (for example, an ID card) is expired or unexpired.

In the confirmation mode, the character changer 110 can change the informative character string in any informative character string display field C11 on the confirmation screen, exclusive of the informative character string display field C11 associated with the expiration date item display field, in accordance with an operation accepted by the operation acceptor 101, but does not change the informative character string in the informative character string display field C11 associated with the expiration date item display field (S42). Thus, among the informative character strings of the informative character string display fields C11 on the confirmation screen, the informative character string of the informative character string display field C11 associated with the expiration date item display field cannot be changed. Therefore, the rigging of the expiration date can be prevented. Hence, data on unexpired original documents (for example, ID cards) can be properly managed.

The controller 100 determines the presence or absence of an instruction to generate a piece of document data (S43). Specifically, when the operation acceptor 101 accepts that a key K41 indicating "Save" shown in FIG. 10A has been pressed by the user, the controller 100 determines that there is an instruction to generate a piece of document data (YES in S43). Then, the data generator 111 generates an expired piece of document data (S44). Then, the controller 100 allows the document data storage 922 to store the expired piece of document data (S27). In this case, not only an unexpired original document (for example, an unexpired ID card) but also an expired original document (for example, an expired ID card) are recorded. Therefore, data on all the acquired original documents (for example, ID cards) can be managed.

On the other hand, when in S43 the operation acceptor 101 accepts that a key K42 indicating "Not Save" shown in FIG. 10A has been pressed by the user, the controller 100 determines that there is no instruction to generate a piece of document data (NO in S43), and allows the processing to proceed to S21 without generating an expired piece of document data. Therefore, an expired piece of document data is not saved in the document data storage 922. Thus, data on unexpired original documents (for example, ID cards) can be properly managed.

Referring back to FIG. 5, when in S25 the expiration determiner 112 determines that the expiration date has not been passed (NO in S25), the data generator 111 generates a piece of document data (S26). Then, the controller 100 allows the document data storage 922 to store the piece of document data (S27) and allows the processing to proceed to S21.

Figure 10B:
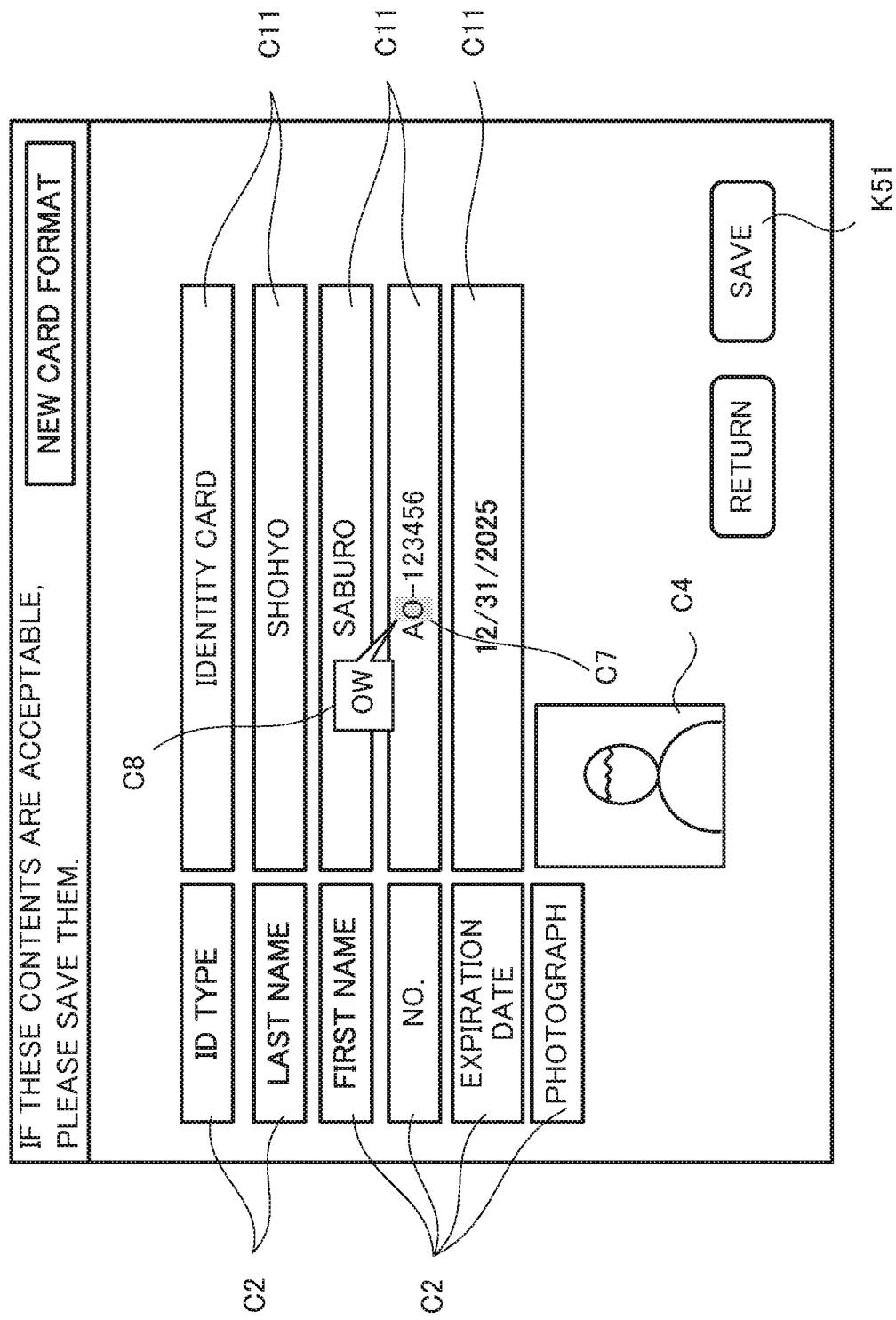
FIG. 10B is a view showing an example of a confirmation screen when a similar character exists.

The following description will consider the case where the informative character string of any informative character string display field C11 on the confirmation screen shown in FIG. 10B contains a similar character. FIG. 10B is a view showing an example of a confirmation screen when a similar character exists.

Suppose that in S23 the display controller 108 allows for the display of a confirmation screen shown in FIG. 10B. When, in the confirmation mode, any informative character string display field C11 on the confirmation screen contains a similar character stored on the HDD 92, as shown in FIG. 10B, the display controller 108 allows the similar character to be displayed in a display manner C7 different in display color from the characters other than the similar character and also allows the reading of the similar character to be displayed in a pop-up manner C8. Thus, the user can be notified that similar characters may be falsely recognized, so that typographical errors for the similar characters, which may be easily missed, can be reduced.

Subsequently, the controller 100 determines the presence or absence of a next individual image (S21). In this case, the processing for the individual images of the original documents D1 and D2 has only been completed and the processing for the individual images of the original documents D3 and D4 remains uncompleted. Therefore, the controller 100 determines that there is a next individual image (YES in S21) and the character recognizer 105 recognizes the characters of the individual image of the original document D3 (S14). Then, the above processing is performed likewise for the original documents D3 and D4, the data generator 111 generates a worksheet containing respective pieces of document data on the original documents D1 to D4 as shown in FIG. 11, and the document data storage 922 stores these pieces of document data collectively in a single standard worksheet file as shown in FIG. 11. When the controller 100 determines that there is no next individual image (NO in S21), it ends this processing.

In the above first embodiment, the document reading device 5 reads a plurality of original documents placed on the document support surface in a batch by a single read job. The individual image cutouter 102 performs processing for cutting out, from image data obtained by reading of the original documents by the document reading device 5, separate individual images of the original documents. The character recognizer 105 recognizes, for each individual image cut out by the individual image cutouter 102, characters contained in a piece of image data on the individual image. The HDD 92 stores a table 921 in which each of type names representing individual types of original documents is associated with a plurality of item names previously set for the individual type of original document. The document determiner 106 determines, for each individual image, whether or not the characters recognized from the individual image by the character recognizer 105 contain a type name shown in the table 921 stored on the HDD 92. When the document determiner 106 determines that the characters recognized from the individual image by the character recognizer 105 contain a type name, the acquirer 107 acquires, from the characters of the individual image determined to contain the type name by the document determiner 106, a plurality of informative character strings associated one-to-one with the plurality of item names shown in the table 921 stored on the HDD 92. The data generator 111 generates, for each individual image, a piece of document data in which the type name determined by the document determiner 106 is associated with the plurality of informative character strings acquired by the acquirer 107. The document data storage 922 stores the pieces of document data generated one for each of the individual images by the data generator 111. Thus, various types of original documents (for example, ID cards) can be read in a batch by the document reading device 5 and data management can be performed according to each type of original document (each ID type).

The image forming apparatus described in BACKGROUND above can manage name cards, but cannot perform data management by taking out only necessary information from various types of ID cards as original documents other than name cards, such as an identity card, a driver's license, and a health insurance card. For example, an ID card describes particular pieces of information different form a name card, including an ID type indicating the type of ID card, information on the expiration date of the ID card, an identification number, such as a certification number, a license number or a health insurance number, and information indicating an issuing institution. Furthermore, ID cards vary in documentary form depending on the ID type. Therefore, it is difficult to determine which piece of information on the ID card is necessary for data management. Hence, the above known image forming apparatus cannot take out, from various types of ID cards, only necessary information for each ID type and perform data management according to the ID type.

Unlike the above known image forming apparatus, in this embodiment, it is possible to read various types of ID cards in a batch by the document reading device and perform data management according to the ID type.

Furthermore, in the setting mode for setting the contents of the table 921, the display controller 108 allows the display device 473 to display: recognized character display fields C1 in each of which a subset of characters recognized by the character recognizer 105 are displayed; category display fields C2 which are provided one for each of the recognized character display fields C1 and into each of which an identification name or an item name can be entered; and necessity specification fields C3 which are provided one for each of the recognized character display fields C1 and in each of which a specification of whether or not the subset of characters displayed in the recognized character display field C1 are to be stored is accepted. The operation acceptor 101 accepts a user's operation. When, in the setting mode, the operation acceptor 101 accepts an operation in which an identification name is entered into the category display field C2 in the necessity specification field C3 associated with which the displayed subset of characters are specified to be stored and item names are entered into the category display fields C2 in the necessity specification fields C3 associated with which the displayed subsets of characters are specified to be stored, and then the operation acceptor 101 accepts an instruction for storage into the table 921, the setter 109 sets the content displayed in the recognized character display field C1 associated with the category display field C2 in which the identification name has been entered to a type name for the table 921, and sets the item names in the category display fields C2 to item names for the table 921. Thus, the user can select and set, among a plurality of characters recognized for each individual image by the character recognizer 105, necessary data according to the type of original document (ID type), so that data management according to the type of original document (ID type) can be further suitably performed.

Moreover, when any informative character string display field C11 on the confirmation screen is blank, the display controller 108 allows the display device 473 to display a message prompting the user to rearrange the plurality of original documents placed on the document support surface or change the setting conditions for reading by the document reading device 5. When viewing the message displayed on the display device 473, the user rearranges the plurality of original documents by changing the directions or positions of the original documents placed on the document support surface or changes the setting conditions for reading by the document reading device 5. Thus, re-reading conditions of the document reading device 5 can be improved. When the re-reading conditions are improved, recognition of characters contained in a piece of image data on each individual image by the character recognizer can be improved, so that various types of original documents (for example, ID cards) can be read in a batch by the document reading device 5 and data can be suitably acquired according to the type of original document (ID type).

Figure 12:
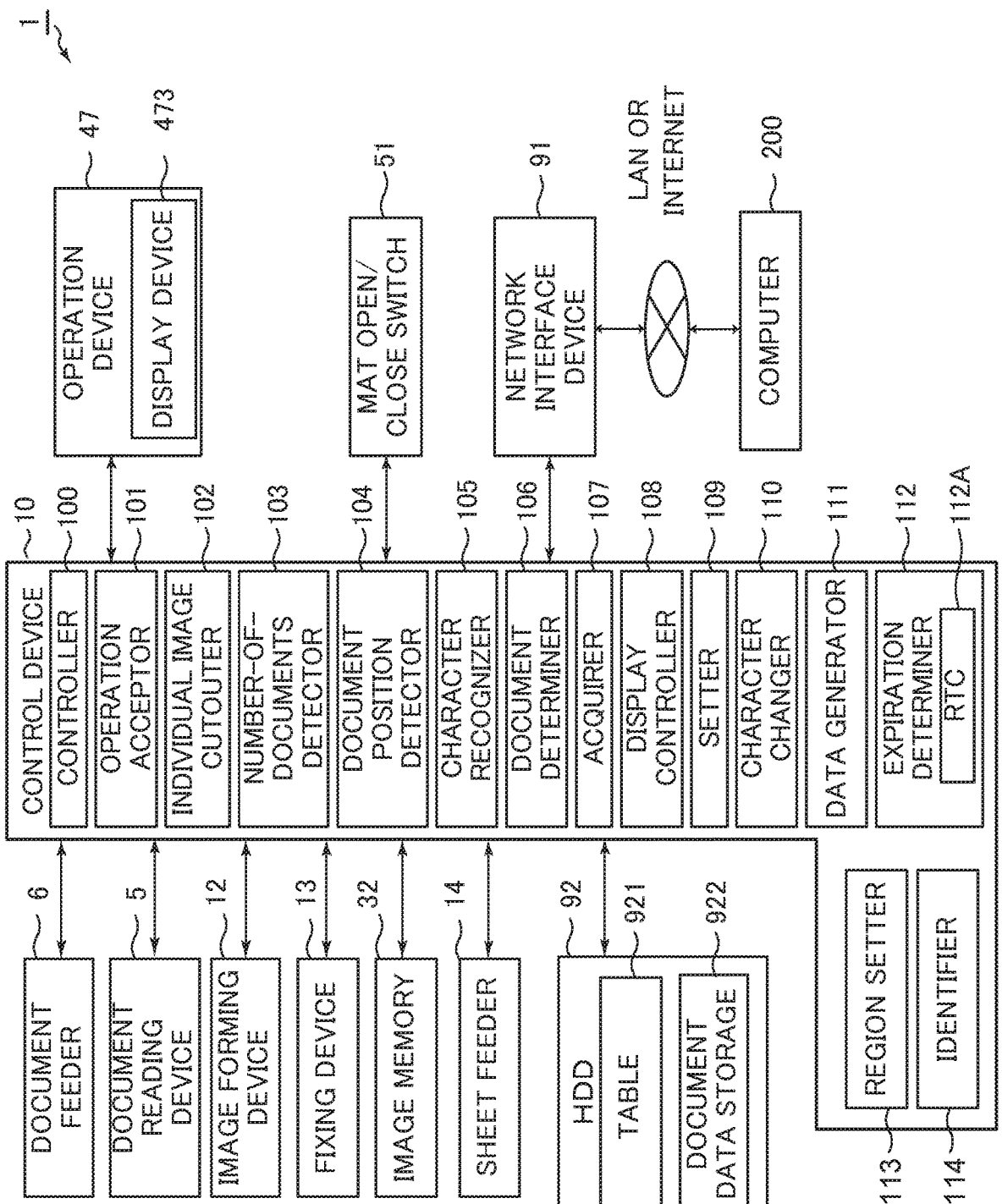
FIG. 12 is a functional block diagram schematically showing an essential internal configuration of an image forming apparatus according to a second embodiment of the present disclosure.

Next, a description will be given of an image forming apparatus 1 according to a second embodiment. FIG. 12 is a functional block diagram schematically showing an essential internal configuration of an image forming apparatus according to a second embodiment of the present disclosure. The second embodiment is different from the first embodiment in that the control device 10 further includes a region setter 113 and an identifier 114 and type names are assigned to a plurality of respective regions into which the document support surface is segmented. In the second embodiment, further explanation of the same processing, configurations, and structures as in the first embodiment is omitted.

Figure 13:
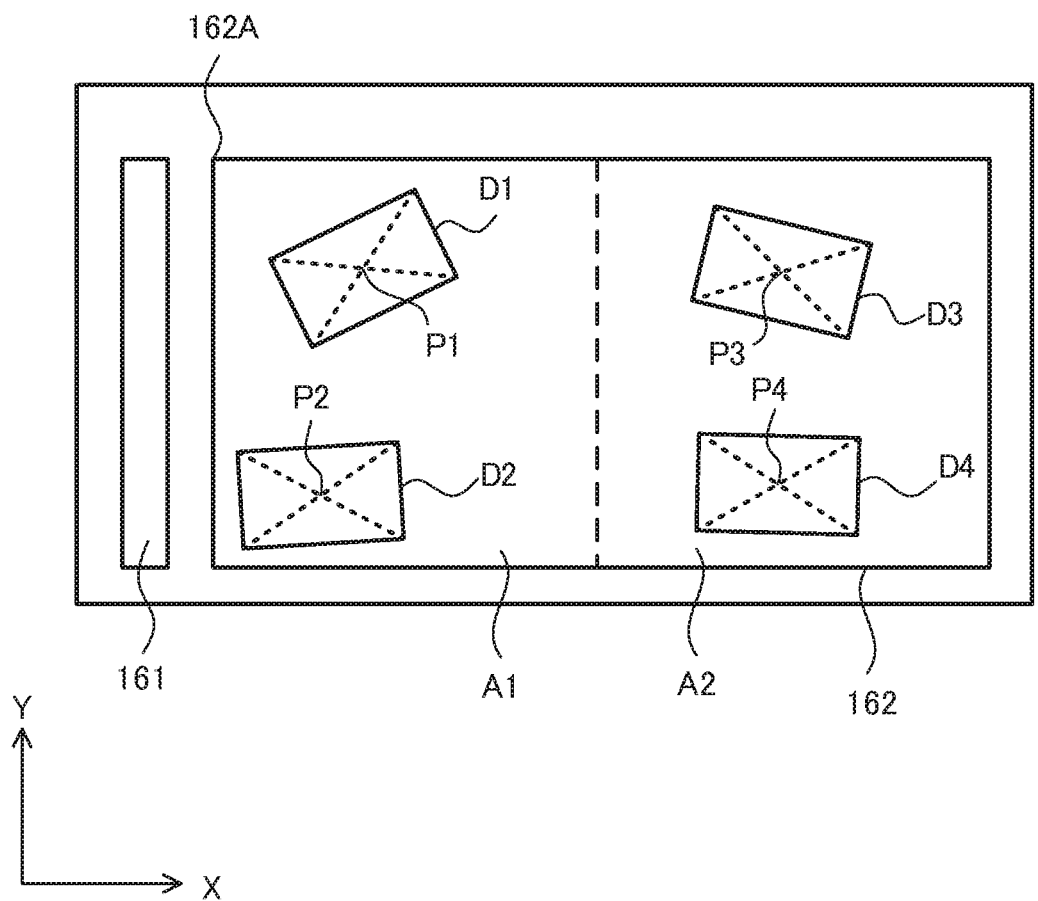
FIG. 13 is a view showing an example where a plurality of segmented regions are set in a platen glass for document placement and reading.

The region setter 113 segments the document support surface into a plurality of regions and assigns type names to the plurality of respective regions. FIG. 13 is a view showing an example where a plurality of segmented regions are set in a platen glass for document placement and reading. For example, as shown in FIG. 13, the region setter 113 segments the platen glass 162 for document placement and reading into a region A1 near the platen glass 161 for conveyance and reading and a region A2 away from the platen glass 161 and sets the type names of the region A1 and the region A2 to "DRIVER'S LICENSE" and "HEALTH INSURANCE CARD", respectively. Although in this embodiment the region of the platen glass 162 for document placement and reading is segmented into halves in the horizontal direction (the direction X), it may be further segmented into halves in the vertical direction (the direction Y) to form a total of four regions or may be segmented into thirds or smaller portions in the horizontal or vertical direction.

The identifier 114 identifies, based on the positional relationship between a plurality of individual images cut out by the individual image cutouter 102 and a plurality of regions to which respective type names are assigned by the region setter 113, to which of the plurality of regions each of the plurality of individual images belongs, and thus identifies type names on the basis of the plurality of individual images. Specifically, based on the positional relationship between the position of each individual image detected by the document position detector 104 and the segmented regions set by the region setter 113, the identifier 114 identifies to which of the two regions A1 and A2 the individual image belongs, thus identifies the type name of the individual image belonging to the region A1 as "DRIVER'S LICENSE", and identifies the type name of the individual image belonging to the region A2 as "HEALTH INSURANCE CARD".

In the case where the identifier 114 identifies type names on the basis of a plurality of individual images, the document determiner 106 does not determine whether or not the characters recognized from each individual image by the character recognizer 105 contain a type name.

The acquirer 107 acquires, from the characters recognized by the character recognizer 105 for each individual image the type name of which has been identified by the identifier 114, a plurality of informative character strings associated one-to-one with the plurality of item names associated with the type name shown in the table 921 stored on the HDD 92.

Figure 14:
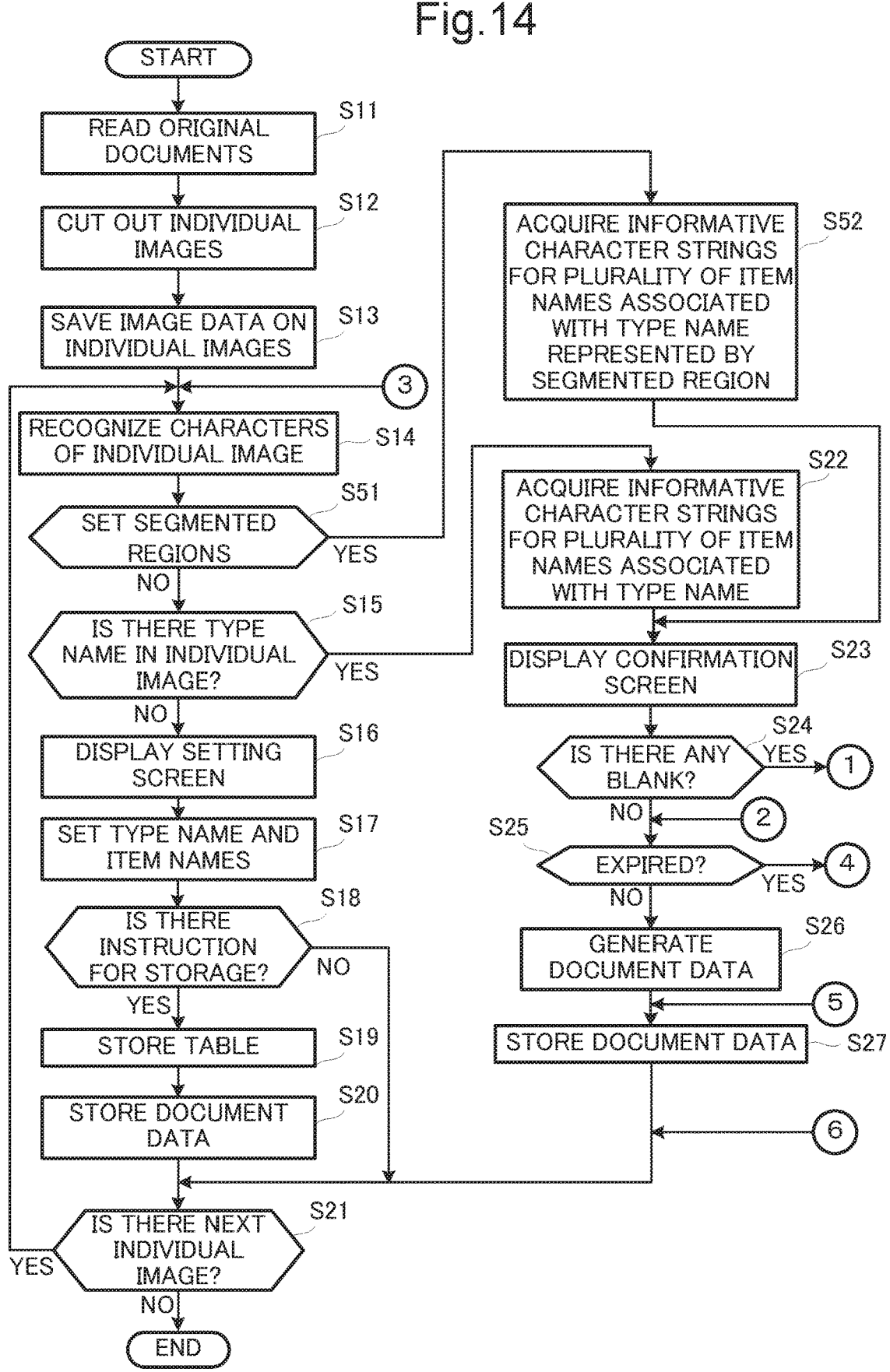
FIG. 14 is a flowchart showing an example of multi-card information gathering processing of the image forming apparatus according to the second embodiment.

Next, a description will be given of multi-card information gathering processing of the image forming apparatus 1 according to the second embodiment with reference to FIG. 14. In the second embodiment, the processing is the same as in the first embodiment except that the processing steps S51 and S52 are added. Therefore, the following description of the second embodiment will be started with SM. The region setter 113 previously segments, as shown in FIG. 13, the surface of the platen glass 162 for document placement and reading into two regions A1 and A2 and previously sets the regions A1 and A2 for "DRIVER'S LICENSE" and "HEALTH INSURANCE CARD", respectively.

The controller 100 determines whether or not the region setter 113 has set segmented regions in the platen glass 162 for document placement and reading (S51). When the controller 100 determines that segmented regions have been set (YES in S51), the identifier 114 identifies, based on the positional relationship between, for example, the position of the individual image of the original document D1 detected by the document position detector 104 and the segmented regions set by the region setter 113, the individual image of the original document D1 belonging to the region A1 and thus identifies the type name for the individual image of the original document D1 belonging to the region A1 as "DRIVER'S LICENSE".

As just described, the identifier 114 identifies the type name for each individual image based on the positional relationship between the position of the individual image and the segmented regions set by the region setter 113. Therefore, so long as the identifier 114 identifies type names on the basis of a plurality of individual images, the document determiner 106 does not determine whether or not the characters recognized from each individual image by the character recognizer 105 contain a type name.

Then, the acquirer 107 acquires, from the characters recognized by the character recognizer 105 for the individual image of the original document D1 the type name of which has been identified by the identifier 114, a plurality of informative character strings associated one-to-one with the plurality of item names associated with "DRIVER'S LICENSE" which is a type name shown in the table 921 stored on the HDD 92 (S52). Specifically, the acquirer 107 acquires "TOKKYO", "TARO", "12345678", and "Mar. 23, 2020" which are a plurality of informative character strings associated one-to-one with "Last Name", "First Name", "No.", and "Expiration Date" which are a plurality of item names associated with "DRIVER'S LICENSE".

On the other hand, when the controller 100 determines that no segmented region has been set (NO in S51), it allows the processing to proceed to S15.

In the second embodiment, so long as the identifier 114 identifies type names on the basis of a plurality of individual images, i.e., type names have been previously assigned to a plurality of respective regions into which the document support surface has been segmented, the document determiner 106 does not determine whether or not the characters recognized from each individual image by the character recognizer 105 contain a type name. Therefore, the processing step for determining whether or not each individual image contains a type name can be dispensed with, so that the burden on the processing can be correspondingly reduced.

In each of the above embodiments, the multi-card information gathering processing may be executed for various original documents, inclusive of name cards and like documents.

The present disclosure is not limited to the structures and configurations of the above embodiments and can be modified in various ways. The structures, configurations, and processing described in the above embodiments with reference to FIGS. 1 to 14 are merely illustrative and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
   a document reading device capable of reading a plurality of original documents placed on a document support surface in a batch by a single read job;
   a storage device that stores a table in which each of type names representing individual types of original documents is associated with a plurality of item names previously set for the individual type of original document;
   a display device;
   a control device that includes a processor and functions, through the processor executing a control program, as:
      an individual image cutouter that performs processing for cutting out, from image data obtained by reading of the plurality of original documents by the document reading device, separate individual images of the original documents;
      a character recognizer that recognizes, for each of the individual images cut out by the individual image cutouter, characters contained in a piece of image data on the individual image;
      a document determiner that determines, for each of the individual images, whether or not the characters recognized from the individual image by the character recognizer contain the type name shown in the table stored in the storage device;
      an acquirer that, upon determination of the document determiner that the characters recognized from the individual image by the character recognizer contain the type name, acquires, from the characters of the individual image determined to contain the type name, a plurality of informative character strings associated one-to-one with the plurality of item names shown in the table stored in the storage device;
      a data generator that generates, for each of the individual images, a piece of document data in which the type name determined by the document determiner is associated with the plurality of informative character strings acquired by the acquirer,
      a display controller that displays screens on the display device;
      an operation acceptor that accepts operations by users; and
      a setter that additionally sets the type name and the item name in the table according to an instruction received by the operation acceptor; and
   a document data storage that stores the pieces of document data generated one for each of the individual images by the data generator,
   wherein when the document determiner does not determine that the type name is not contained, the display controller cause the display device to display all the characters recognized by the character recognizer for the individual image determined not to include the type name,
   the operation acceptor accepts a designation of characters are associated with the type name and the item name additionally set by the setter from all the characters displayed on the display unit, and
   the document data storage stores document data for each of the individual images in which the type name and the item name additionally set by the setter are associated with the characters for which the designation has been accepted by the operation acceptor.

2. An image forming apparatus comprising:
   a document reading device capable of reading a plurality of original documents placed on a document support surface in a batch by a single read job;
   a storage device that stores a table in which each of type names representing individual types of original documents is associated with a plurality of item names previously set for the individual type of original document;
   a control device that includes a processor and functions, through the processor executing a control program, as:
      an individual image cutouter that performs processing for cutting out, from image data obtained by reading of the plurality of original documents by the document reading device, separate individual images of the original documents;
      a character recognizer that recognizes, for each of the individual images cut out by the individual image cutouter, characters contained in a piece of image data on the individual image;
      a document determiner that determines, for each of the individual images, whether or not the characters recognized from the individual image by the character recognizer contain the type name shown in the table stored in the storage device;
      an acquirer that, upon determination of the document determiner that the characters recognized from the individual image by the character recognizer contain the type name, acquires, from the characters of the individual image determined to contain the type name, a plurality of informative character strings associated one-to-one with the plurality of item names shown in the table stored in the storage device; and
      a data generator that generates, for each of the individual images, a piece of document data in which the type name determined by the document determiner is associated with the plurality of informative character strings acquired by the acquirer, and a document data storage that stores the pieces of document data generated one for each of the individual images by the data generator, and a display device, wherein the control device further functions, through the processor executing the control program, as:

a display controller that, in a setting mode for setting contents of the table, allows the display device to display a setting screen containing (a) recognized character display fields in each of which a subset of characters recognized by the character recognizer are displayed, (b) category display fields which are provided one for each of the recognized character display fields and into each of which an identification name or the type name is to be entered, and (c) necessity specification fields which are provided one for each of the recognized character display fields and in each of which a specification of whether or not the subset of characters displayed in the recognized character display field are to be stored is accepted;

an operation acceptor that accepts an operation of a user; and a setter, and, when in the setting mode the operation acceptor accepts an operation in which the identification name is entered into the category display field in the necessity specification field associated with which the displayed subset of characters are specified to be stored and the item names are entered into the category display fields in the necessity specification fields associated with which the displayed subsets of characters are specified to be stored, and then the operation acceptor accepts an instruction for storage into the table, the setter sets a content displayed in the recognized character display field associated with the category display field into which the identification name has been entered to the type name for the table and the setter sets the item names in the category display fields to the item names for the table.

3. The image forming apparatus according to claim 2, wherein, in a confirmation mode for allowing the user to confirm the plurality of informative character strings associated with the plurality of item names and acquired by the acquirer, the display controller allows the display device to display a confirmation screen containing: the plurality of category display fields; and a plurality of informative character string display fields which are associated one-to-one with the plurality of category display fields and in which the plurality of respective informative character strings acquired by the acquirer are displayed.

4. The image forming apparatus according to claim 3, wherein the storage device stores a predetermined similar character that may be falsely recognized, and when in the confirmation mode any of the informative character string display fields on the confirmation screen contains the similar character stored in the storage device, the display controller allows the similar character to be displayed in a different display manner from the characters other than the similar character.

5. The image forming apparatus according to claim 3, wherein the storage device stores a predetermined similar character that may be falsely recognized, and when in the confirmation mode any of the informative character string display fields on the confirmation screen contains the similar character stored in the storage device, the display controller allows reading of the similar character to be popped up.

6. The image forming apparatus according to claim 3, wherein when any of the informative character string display fields on the confirmation screen is blank, the display controller allows the display device to display an image in a predetermined location where an informative character string to be displayed in the blank informative character string display field will be described, in a display area provided alongside of the blank informative character string display field.

7. The image forming apparatus according to claim 4, wherein the control device further functions, through the processor executing the control program, as a character changer that, in the confirmation mode, changes one or more of the informative character strings in the informative character string display fields on the confirmation screen in accordance with an operation accepted by the operation acceptor, and the data generator generates a piece of document data in which the type name determined by the document determiner, the plurality of informative character strings acquired by the acquirer, and one or those of the plurality of informative character strings changed by the character changer are associated with each other.

8. The image forming apparatus according to claim 3, wherein the plurality of category display fields include an expiration date item display field representing an item for an expiration date, the control device further functions, through the processor executing the control program, as an expiration determiner that, in the confirmation mode, determines whether or not an expiration date indicated by the informative character string displayed in the informative character string display field associated with the expiration date item display field on the confirmation screen has been passed, and when the expiration determiner determines that the expiration date has been passed, the display controller allows the display device to display an error message indicating an expiration.

9. The image forming apparatus according to claim 8, wherein the expiration determiner includes a real-time clock and determines whether or not the expiration date has been passed by comparing a present time and date measured by the real-time clock with the informative character string displayed in the informative character string display field associated with the expiration date item display field.

10. The image forming apparatus according to claim 8, wherein the control device further functions, through the processor executing the control program, as a character changer that, in the confirmation mode, changes one or more of the informative character strings in the informative character string display fields on the confirmation screen in accordance with an operation accepted by the operation acceptor, and in the confirmation mode, the character changer changes the informative character string in any of the informative character string display fields on the confirmation screen, exclusive of the informative character string display field associated with the expiration date item display field, in accordance with the operation accepted by the operation acceptor, but keeps from changing the informative character string in the informative character string display field associated with the expiration date item display field.

11. The image forming apparatus according to claim 3, wherein when any of the informative character string display fields on the confirmation screen is blank, the display controller allows the display device to display a message prompting the user to rearrange the plurality of original documents placed on the document support surface or change setting conditions for reading of the plurality of original documents by the document reading device.

* * * * *